(12) United States Patent
Iizuka et al.

(10) Patent No.: US 8,913,885 B2
(45) Date of Patent: Dec. 16, 2014

(54) INFORMATION PROVISION SYSTEM, SERVER, TERMINAL DEVICE, INFORMATION PROVISION METHOD, DISPLAY CONTROL METHOD AND RECORDING MEDIUM

(71) Applicant: Casio Computer Co., Ltd., Tokyo (JP)

(72) Inventors: Nobuo Iizuka, Hamura (JP); Shinichi Moritani, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 89 days.

(21) Appl. No.: 13/719,528

(22) Filed: Dec. 19, 2012

(65) Prior Publication Data
US 2013/0163994 A1 Jun. 27, 2013

(30) Foreign Application Priority Data
Dec. 27, 2011 (JP) .................................. 2011-286846

(51) Int. Cl.
- *G03B 17/00* (2006.01)
- *H04B 10/114* (2013.01)
- *H04B 10/116* (2013.01)

(52) U.S. Cl.
CPC .......... *H04B 10/1149* (2013.01); *H04B 10/116* (2013.01)
USPC .......................................................... 396/56

(58) Field of Classification Search
USPC .................... 396/56, 57; 348/211.2, 211.3
See application file for complete search history.

(56) References Cited

U.S. PATENT DOCUMENTS

| | | | |
|---|---|---|---|
| 6,999,112 B2 * | 2/2006 | Seaman et al. | 348/207.1 |
| 7,308,194 B2 | 12/2007 | Iizuka et al. | |
| 8,280,398 B2 | 10/2012 | Ishii et al. | |
| 2002/0071677 A1 * | 6/2002 | Sumanaweera | 396/429 |
| 2006/0218627 A1 | 9/2006 | Komatsu | |
| 2007/0275750 A1 | 11/2007 | Nakagawa | |

(Continued)

FOREIGN PATENT DOCUMENTS

| | | |
|---|---|---|
| JP | 2001243310 A | 9/2001 |
| JP | 2001356981 A | 12/2001 |

(Continued)

OTHER PUBLICATIONS

Japanese Office Action dated May 7, 2013 (and English translation thereof) in counterpart Japanese Application No. 2011-286846.

(Continued)

*Primary Examiner* — W B Perkey
(74) *Attorney, Agent, or Firm* — Holtz, Holtz, Goodman & Chick PC

(57) ABSTRACT

For setting a tag ID in association with a content supposed to be provided to a portable terminal, the server acquires the location information of an illumination device of which the content is already stored in the memory and sets a tag ID in association with an illumination device that is away from the location presented by the location information by a given or longer distance. Then, the server associates and stores in the memory the set tag ID, location information of the illumination device transmitting the tag ID, content supposed to be provided. Subsequently, the server receives the tag ID and location information transmitted from a portable terminal, determines the content to transmit based on the received location information and the element stored in the memory, and transmits the determined content to the portable terminal.

19 Claims, 19 Drawing Sheets

(56) References Cited

U.S. PATENT DOCUMENTS

| | | |
|---|---|---|
| 2008/0167057 A1 | 7/2008 | Miyashita |
| 2010/0123905 A1 | 5/2010 | Aoyama |
| 2011/0290873 A1* | 12/2011 | Nishiguchi et al. ........... 235/376 |
| 2014/0086591 A1 | 3/2014 | Iizuka |

FOREIGN PATENT DOCUMENTS

| | | | |
|---|---|---|---|
| JP | 2002133198 A | 5/2002 | |
| JP | 2003016093 A | 1/2003 | |
| JP | 2003-319033 A | 11/2003 | |
| JP | 2005070863 A | 3/2005 | |
| JP | 2005-284453 A | 10/2005 | |
| JP | 2006-20294 A | 1/2006 | |
| JP | 2006180217 A | 7/2006 | |
| JP | 2006268689 A | 10/2006 | |
| JP | 2007-067487 A | 3/2007 | |
| JP | 2008085555 A | 4/2008 | |
| JP | 2009-87176 A | 4/2009 | |
| JP | 2009284079 A | 12/2009 | |
| JP | 2010-107235 A | 5/2010 | |
| JP | 2010-121972 A | 6/2010 | |
| JP | 2010130438 A | 6/2010 | |
| JP | 2011199800 A | 10/2011 | |
| WO | 01/52131 A1 | 7/2001 | |
| WO | WO 2005/074311 A1 | 8/2005 | |
| WO | WO 2005/086375 A1 | 9/2005 | |
| WO | 2006/098235 A1 | 9/2006 | |

OTHER PUBLICATIONS

U.S. Appl. No. 14/031,913, filed Sep. 19, 2013, First Named Inventor: Nobuo Iizuka, Title: "Information Processing System, Information Processing Method, Client Device, and Recording Medium".

Japanese Office Action dated Apr. 22, 2014 issued in counterpart Japanese Application No. 2013-140870.

* cited by examiner

| DEVICE ID | DEVICE LOCATION INFORMATION | TAG ID_a | CONTENT CORRESPONDING TO TAG ID_a |
|---|---|---|---|
| | | | |

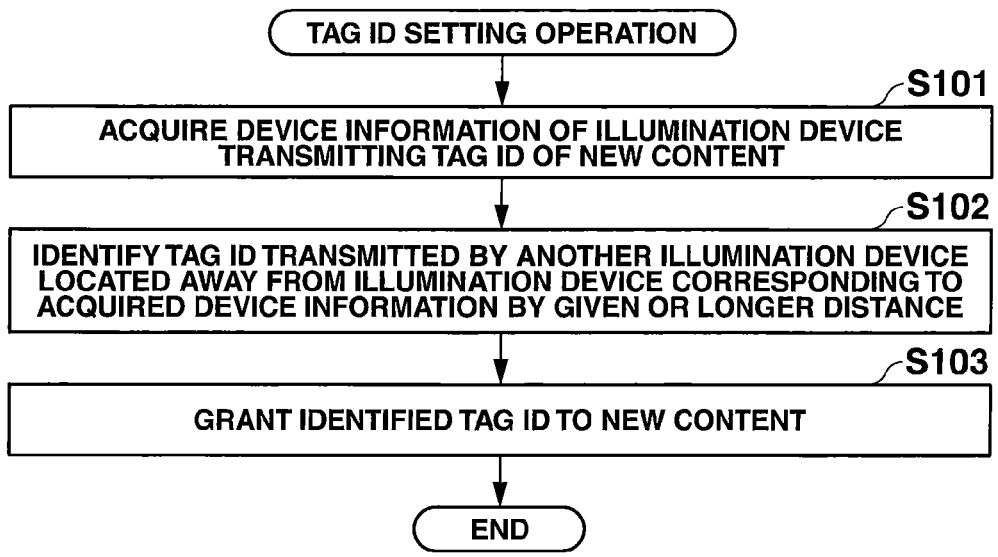
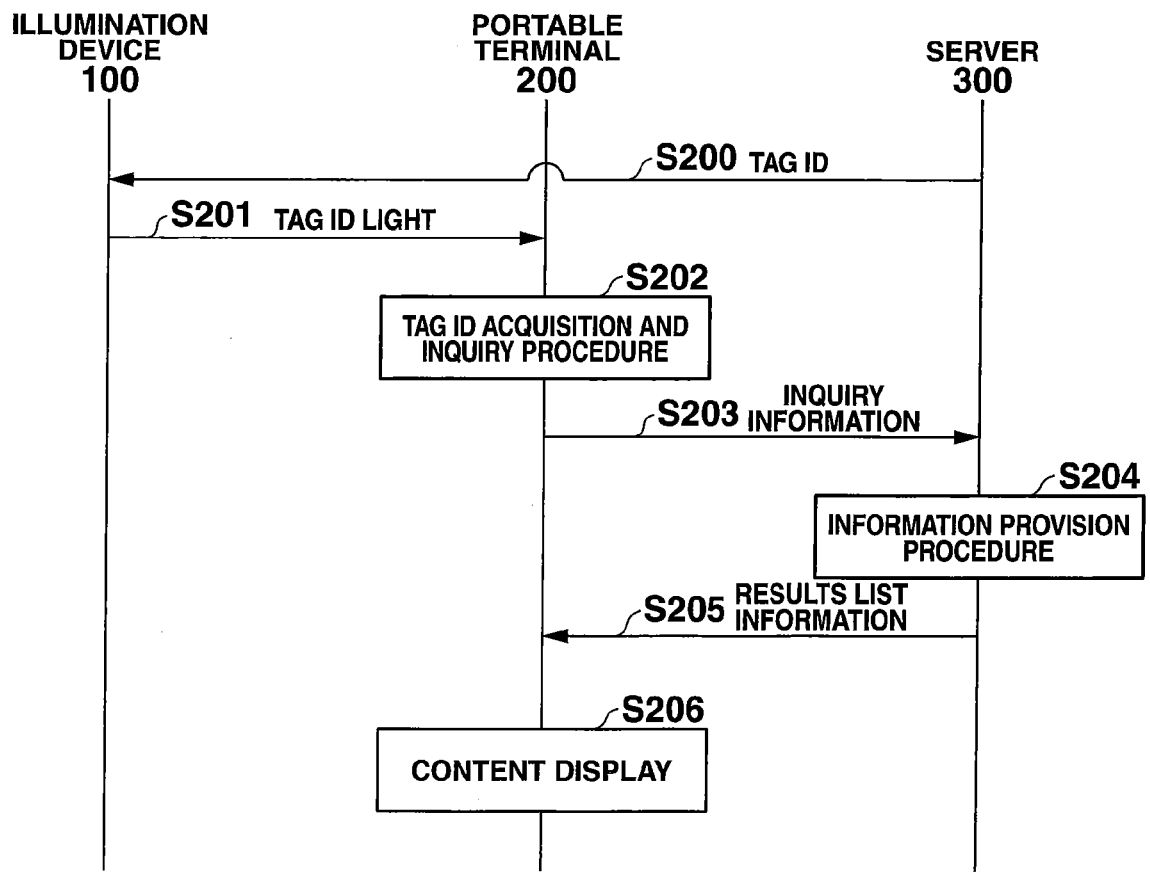

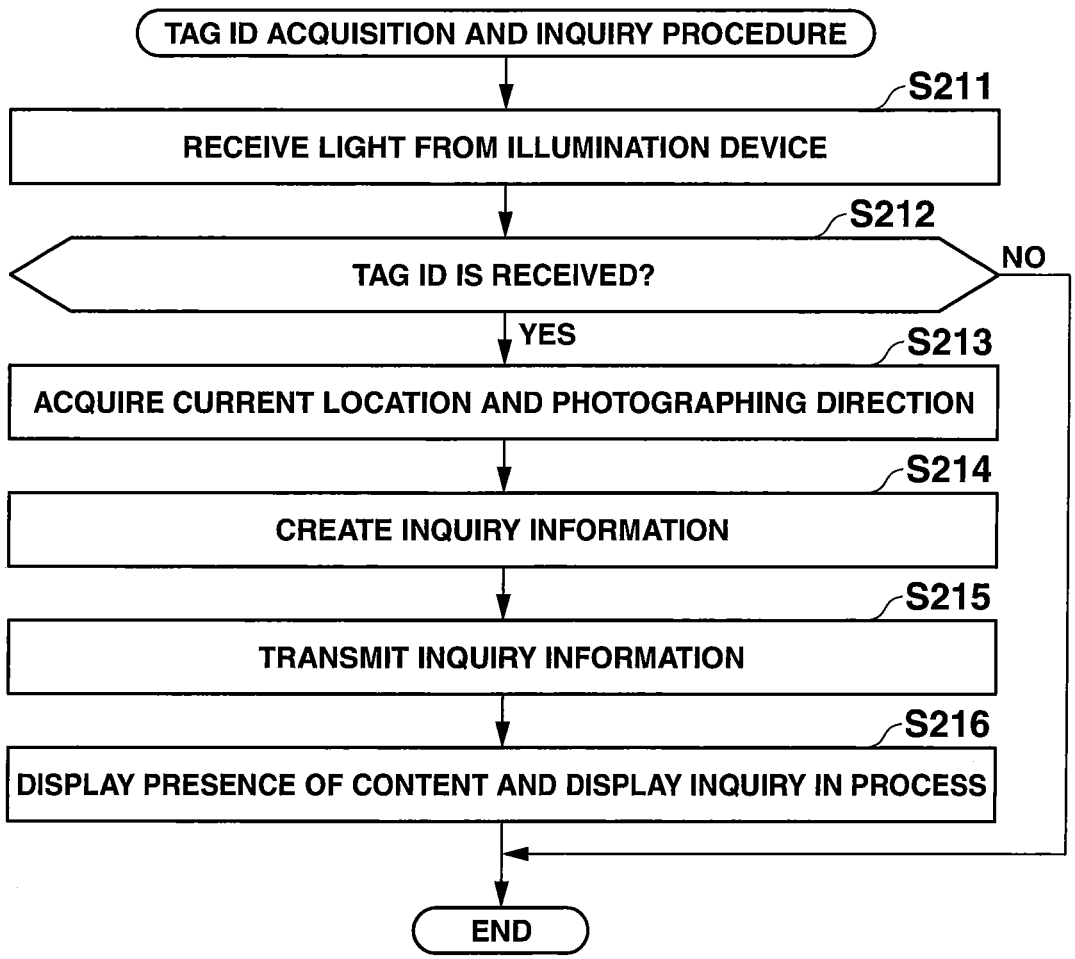

FIG.11A
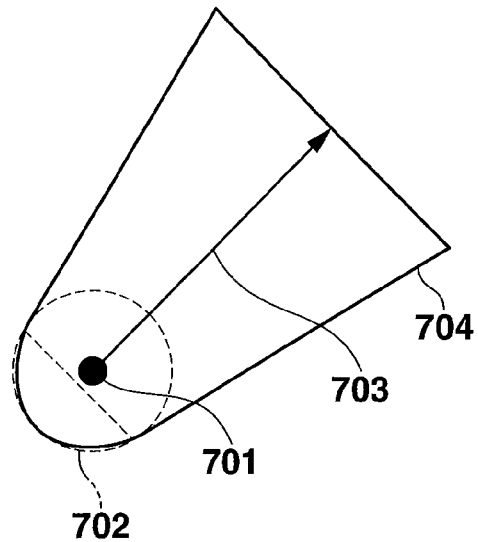
FIG.11B
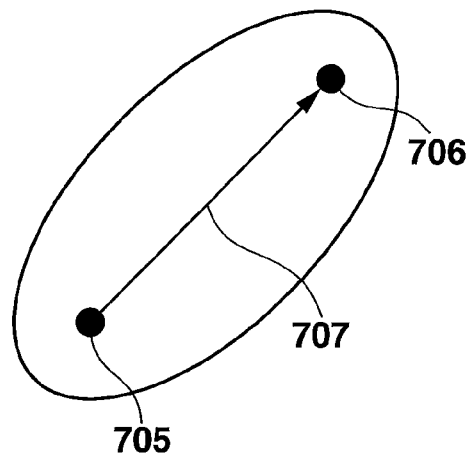
FIG.12
| TAG ID_a | CONTENT CORRESPONDING TO TAG ID_a | TAG ID_b | CONTENT CORRESPONDING TO TAG ID_b | ..... |
|---|---|---|---|---|
FIG.13
| DEVICE ID | DEVICE LOCATION INFORMATION | REACHABLE RANGE INFORMATION | TAG ID_a | CONTENT CORRESPONDING TO TAG ID_a |
|---|---|---|---|---|

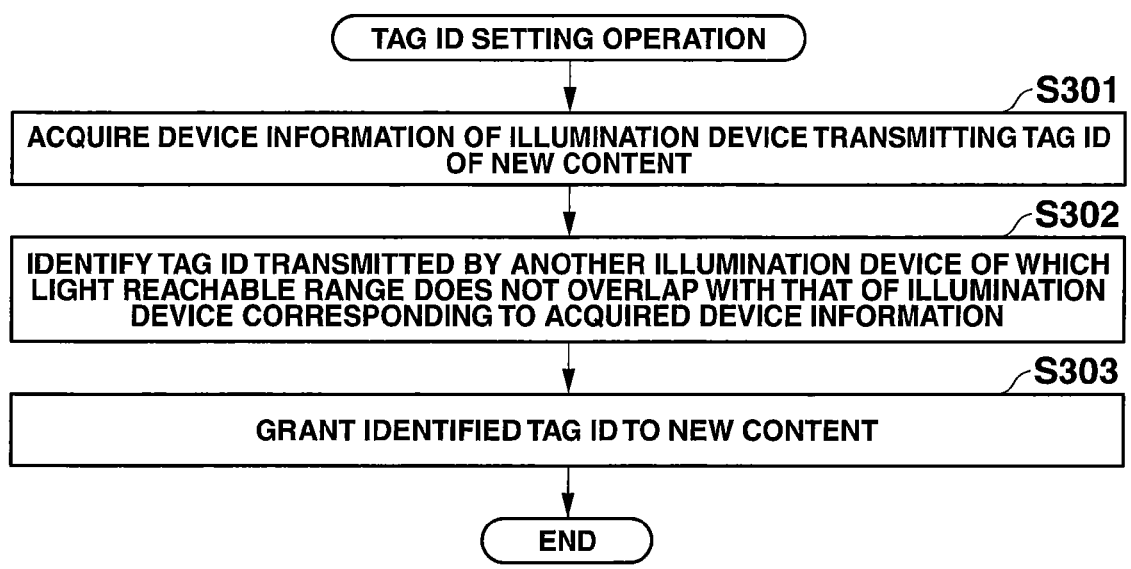

FIG.18

| TAG ID_a | LIGHT RECEPTION POSITION INFORMATION α | CONTENT CORRESPONDING TO TAG ID_a | TAG ID_a | LIGHT RECEPTION POSITION INFORMATION β | CONTENT CORRESPONDING TO TAG ID_a | ...... |

INFORMATION PROVISION SYSTEM, SERVER, TERMINAL DEVICE, INFORMATION PROVISION METHOD, DISPLAY CONTROL METHOD AND RECORDING MEDIUM

CROSS-REFERENCE TO RELATED APPLICATION

This application claims the benefit of Japanese Patent Application No. 2011-286846, filed on Dec. 27, 2011, the entire disclosure of which is incorporated by reference herein.

FIELD

This application relates to an information provision system, server, terminal device, information provision method, display control method, and recording medium using visible light as the transmission medium.

BACKGROUND

Visible light transmission techniques utilizing image sensors for processing captured time-series images (frames) have been known. For example, in the case of using an outdoor illumination device or the like as a transmission device emitting light modulated based on information, the information can be acquired by continuously photographing the transmission device with a camera installed in a terminal device to receive the light emitted by the transmission device and demodulating the light (for example, see Unexamined Japanese Patent Application Kokai Publication No. 2006-20294).

The photographing frame rate of a current conventional camera is around 30 frames/second. Using such a camera for the above visible light transmission, the optical transmission bit rate is approximately 15 bits/second. If RGB color modulation is used for changing the light color, the bit rate will approximately be tripled.

However, using the above bit rate in transferring a large volume of information such as sounds and images is practically difficult.

SUMMARY

An exemplary object of the present invention is to reduce the time to acquire information even if the volume of information to be transferred is relatively large with respect to the transfer bit rate.

In order to achieve the above object, the information provision system according to a first exemplary aspect of the present invention is an information provision system including a plurality of transmission devices presents at different locations each other, a terminal device, and a server providing contents to the terminal device, wherein the transmission devices each comprise a first transmitter modulating identification information for identifying the content and transmitting the modulated element by means of light as a transmission medium, the terminal device comprises a light receiver receiving the element transmitted from the first transmitter by means of light as a transmission medium; an identification information acquirer demodulating the light received by the light receiver and acquiring the identification information; a location information acquirer acquiring location information of the self; and a second transmitter transmitting the identification information acquired by the identification information acquirer and the location information of the self acquired by the location information acquirer to the server, and the server comprises a storage associating and storing the location information of the transmission device, identification information, and content; a setter setting identification information in association with a content supposed to be provided by acquiring the location information of the transmission device of which the content is already stored in the storage and setting the identification information in association with a transmission device that is away from the location presented by the location information by a given or longer distance; a storing controller controlling the identification information set by the setter, location information of the transmission device transmitting the identification information, and content to be associated and stored in the storage; a first receiver receiving the identification information and location information transmitted from the second transmitter of the terminal device; a determiner determining the content to be transmitted based on the location information of the terminal device received by the first receiver and the element stored in the storage; and a third transmitter transmitting the content determined by the determiner to the terminal device.

Furthermore, in order to achieve the above object, the server according to a second exemplary aspect of the present invention is a server in an information provision system including a plurality of transmission devices presents at different locations each other, a terminal device, and a server providing contents to the terminal device, comprising a storage associating and storing the location information of the transmission device, identification information, and content; a setter setting identification information in association with a content supposed to be provided by acquiring the location information of the transmission device of which the content is already stored in the storage and setting the identification information in association with a transmission device that is away from the location presented by the location information by a given or longer distance; a storing controller controlling the identification information set by the setter, location information of the transmission device transmitting the identification information, and content to be associated and stored in the storage; a receiver receiving the identification information and location information transmitted from the terminal device; a determiner determining the content to be transmitted based on the location information of the terminal device received by the receiver and the element stored in the storage; and a transmitter transmitting the content determined by the determiner to the terminal device.

Furthermore, in order to achieve the above object, the terminal device according to a third exemplary aspect of the present invention comprises a creator creating a content; a transmitter transmitting the content created by the creator to an external server; a receiver receiving identification information associated with the transmitted information by the external server that has received the information; a display; a modulator modulating the identification information received by the receiver to information to be displayed on the display and changing in a time series manner; and a first display controller controlling the display based on the information modulated by the modulator.

Furthermore, in order to achieve the above object, the information provision method according to a fourth exemplary aspect of the present invention is an information provision method for a server in an information provision system including a plurality of transmission devices presents at different locations each other, a terminal device, and a server providing contents to the terminal device, including a setting step of setting identification information in association with a content supposed to be provided by acquiring the location information of the transmission device of which the content is already stored in a storage associating and storing the location information of the transmission device, identification information, and content in advance, and setting the identification information in association with a transmission device that is away from the location presented by the location information by a given or longer distance; a storing control step of controlling the identification information set in the setting step, location information of the transmission device transmitting the identification information, and content to be associated and stored in the storage; a reception step of receiving the identification information and location information transmitted from the terminal device; a determination step of determining the content to be transmitted based on the location information of the terminal device received in the reception step and the element stored in the storage; and a transmission step of transmitting the content determined in the determination step to the terminal device.

Furthermore, in order to achieve the above object, the display control method according to a fifth exemplary aspect of the present invention includes a creation step of creating a content; a transmission step of transmitting the content created in the creation step to an external server; a reception step of receiving identification information associated with the transmitted information by the external server that has received the information; a modulation step of modulating the identification information received in the reception step to information to be displayed on the display and changing in a time series manner; and a display control step of controlling the display based on the information modulated in the modulation step.

Furthermore, in order to achieve the above object, the recording medium having programs stored according to a sixth exemplary aspect of the present invention allows a server in an information provision system including a plurality of transmission devices presents at different locations each other, a terminal device, and a server providing contents to the terminal device to function as a setter setting identification information in association with a content supposed to be provided by acquiring the location information of the transmission device of which the content is already stored in a storage associating and storing the location information of the transmission device, identification information, and content in advance, and setting the identification information in association with a transmission device that is away from the location presented by the location information by a given or longer distance; a storing controller controlling the identification information set by the setter, location information of the transmission device transmitting the identification information, and content to be associated and stored in the storage; a receiver receiving the identification information and location information transmitted from the terminal device; a determiner determining the content to be transmitted based on the location information of the terminal device received by the receiver and the element stored in the storage; and a transmitter transmitting the content determined by the determiner to the terminal device.

Furthermore, in order to achieve the above object, the recording medium having programs stored according to a seventh exemplary aspect of the present invention allows a computer in a terminal device comprising a display to function as a creator creating a content; a transmitter transmitting the content created by the creator to an external server; a receiver receiving identification information associated with the transmitted information by the external server that has received the information; a modulator modulating the identification information received by the receiver to information to be displayed on the display and changing in a time series manner; and a first display controller controlling the display based on the information modulated by the modulator.

BRIEF DESCRIPTION OF THE DRAWINGS

A more complete understanding of this application can be obtained when the following detailed description is considered in conjunction with the following drawings, in which:

FIG. 6 is a flowchart showing an exemplary operation of the tag ID setting conducted by the server according to Embodiment 1;

FIG. 7 is an illustration showing an exemplary operation of the information provision conducted by the information provision system according to Embodiment 1;

FIG. 8 is a flowchart showing an exemplary operation of the tag ID acquisition and inquiry procedure conducted by the portable terminal according to Embodiment 1;

FIG. 9 is an illustration showing an example of the inquiry information according to Embodiment 1;

FIG. 11A is an illustration showing an exemplary search area according to Embodiment 1 in which the search area consists of a combination of areas;

FIG. 11B is an illustration showing an exemplary search area according to Embodiment 1 in which the search area consists of an elliptic area including the foci;

FIG. 12 is an illustration showing an example of the results list information according to Embodiment 1;

FIG. 13 is an illustration showing an example of the device information according to Embodiment 1;

FIG. 14 is a flowchart showing an exemplary operation of the tag ID setting conducted by the server according to Embodiment 1;

FIG. 15 is an illustration showing an example of the inquiry information according to Embodiment 1;

FIG. 18 is an illustration showing an example of the results list information according to Embodiment 1;

DETAILED DESCRIPTION

Embodiment 1

The information provision system and information provision method according to Embodiment 1 of the present invention will be described hereafter with reference to the drawings.

Figure 1:
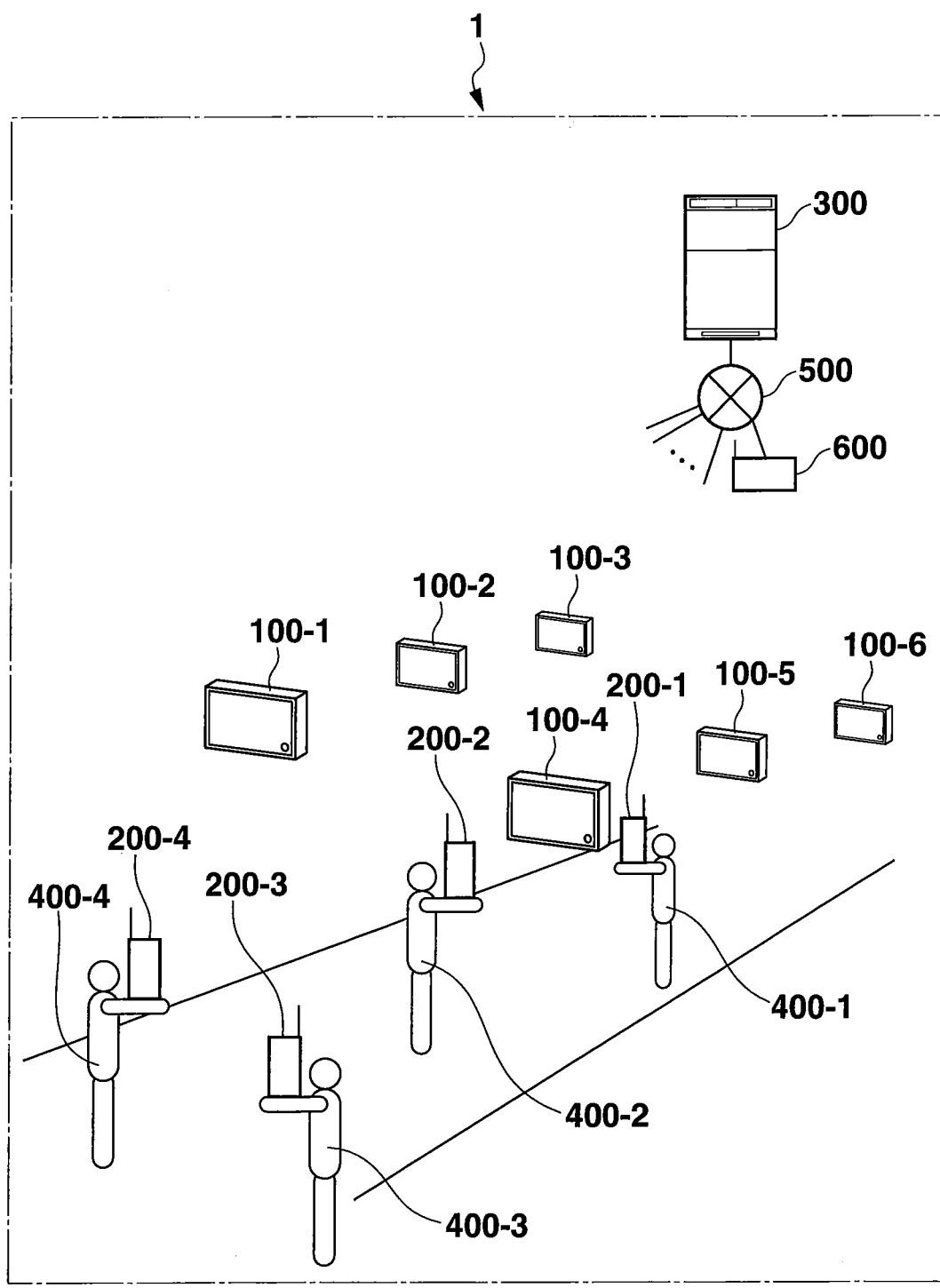
FIG. 1 is an illustration showing an exemplary configuration of transmission devices, portable terminals, and a server constituting the information provision system according to Embodiment 1 of the present invention.

As shown in FIG. 1, an information provision system 1 is configured to include illumination devices (transmission devices) 100-1 to 100-6, portable terminals (terminal devices) 200-1 to 200-4, and a server 300.

The illumination devices 100 illuminate outdoors where users 400-1 to 400-4 are present. The illumination devices 100 modulate the tag IDs that are the identification information of contents provided to the terminal devices 200 from the server 300 so that the luminance changes in a time series manner, and emit the modulated light.

In this embodiment, the illumination devices 100 include a sign indicating that a store name, product name, and/or text messages which specify that an additional content is available by photographing the self, and the like.

The portable terminals 200 are portable terminals with wireless communication capability.

The portable terminal 200-1 is carried by the user 400-1 and the portable terminal 200-2 is carried by the user 400-2.

Furthermore, the portable terminal 200-3 is carried by the user 400-3 and the portable terminal 200-4 is carried by the user 400-4.

The portable terminals 200 acquire a tag ID by photographing the luminance-modulated light (receive light) from the illumination devices 100 and demodulating the light, and transmit the tag ID to the server 300 via a wireless base station 600 and communication network 500.

The server 300 communicates with the illumination devices 100 via the communication network 500.

Furthermore, the server 300 communicates with the portable terminals 200 via the communication network 500 and wireless base station 600.

The server 300 supervises the contents and tag IDs and transmits the content corresponding to a tag ID received from a portable terminal 200 to the portable terminal 200.

Detailed structure of an illumination device 100 will be described hereafter.

Figure 2:
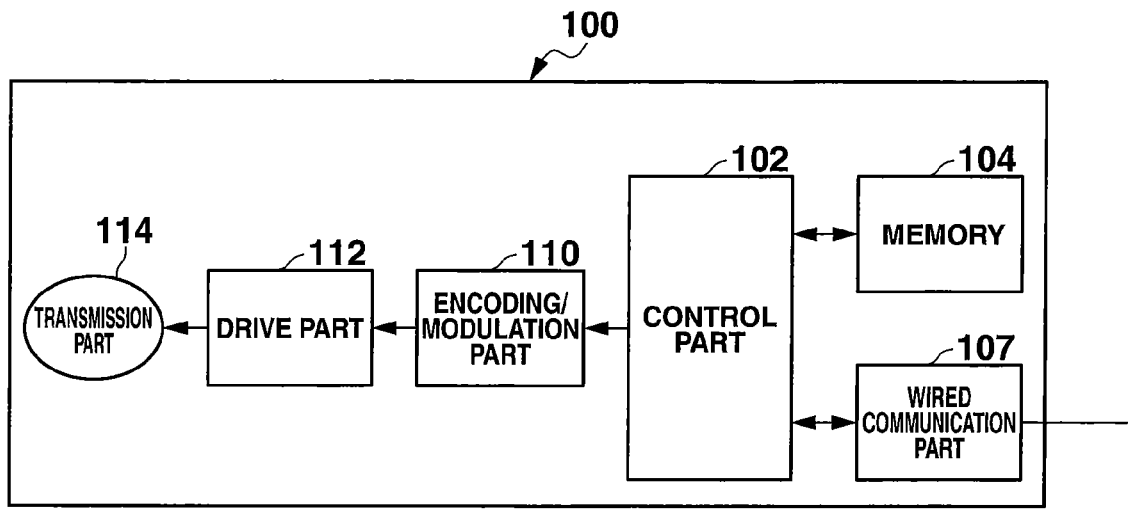
FIG. 2 is an illustration showing an exemplary structure of an illumination device according to Embodiment 1.

As shown in FIG. 2, an illumination device 100 includes a control part 102, a memory 104, a wired communication part 107, an encoding/modulation part 110, a drive part 112, and a transmission part 114.

The control part 102 is composed of, for example, a CPU (central processing unit).

The control part 102 controls various functions of the illumination device 100 by executing software procedures according to programs stored in the memory 104.

The memory 104 is, for example, a RAM (random access memory) and/or ROM (read only memory).

The memory 104 stores various pieces of information (programs and the like) used for control on the illumination device 100.

The wired communication part 107 is, for example, a LAN (local area network) card.

The wired communication part 107 communicates with the server 300 via the communication network 500.

The encoding/modulation part 110 encodes data output from the control part 102 into a bit data string.

Furthermore, the encoding/modulation part 110 conducts digital modulation based on the bit data string.

A desired modulation scheme to employ is 4PPM (pulse position modulation) using a carrier wave of a frequency of 28.8 (kHz).

The drive part 112 generates drive signals corresponding to signals output from the encoding/modulation part 110 and used for temporally changing the luminance of light emitted by the transmission part 114.

The drive signals drive the luminance to rise to a first given value or higher at times when a pulse occurs in accordance with a bit "1" and to drop to a second given value or lower at times when no pulse occurs in accordance with a bit "0" (here, the second given value<the first given value).

The transmission part 114 is, for example, an LED (light emitting diode).

The transmission part 114 emits light having the luminance temporally changing between the first given or higher value and the second given or lower value according to the drive signals output from the drive part 112.

Detailed structure of a portable terminal 200 will be described hereafter.

Figure 3:
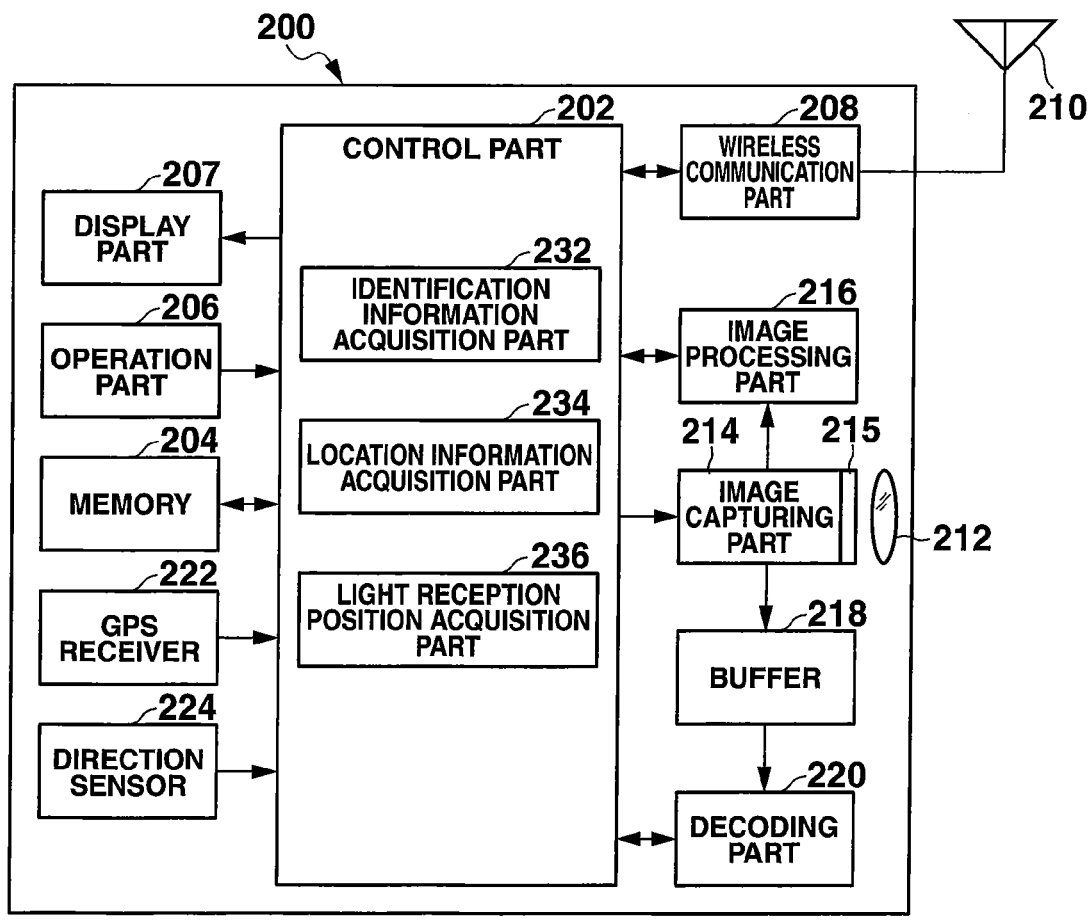
FIG. 3 is an illustration showing an exemplary structure of a portable terminal according to Embodiment 1.

As shown in FIG. 3, a portable terminal 200 includes a control part 202, a memory 204, an operation part 206, a display part 207, a wireless communication part 208, an antenna 210, a lens 212, an image capturing part 214, an image processing part 216, a buffer 218, a decoding part 220, a GPS (global positioning system) device 222, and a direction sensor 224.

The control part 202 is composed of, for example, a CPU.

The control part 202 has an identification information acquisition part 232 and a location information acquisition part 234 for executing software procedures according to programs stored in the memory 104 so as to realize various functions of the portable terminal 200.

The memory 204 is, for example, a RAM and/or ROM. The memory 204 stores various kinds of information (programs and the like) used for control on the portable terminal 200.

The operation part 206 is composed of a numeric keypad and function keys, and serves as an interface for input of operation details from the user.

The display part 207 is composed of, for example, an LCD (liquid crystal display), PDP (plasma display panel), or EL (electroluminescence) display.

The display part 207 displays images (for example, through-the-lens images described later) according to image signals output from the control part 202.

The wireless communication part 208 is configured with, for example, a radio frequency (RF) circuit or baseband (BB) circuit.

The wireless communication part 208 transmits/receives radio signals via the antenna 210.

Furthermore, the wireless communication part 208 encodes and modulates transmission signals and demodulates and decodes reception signals.

The lens 212 is composed of a zoom lens or the like.

The lens 212 is shifted by means of zoom control operation from the operation part 206 and focusing control by the control part 202.

Shifting the lens 212 results in controlling the image-capturing field angle and optical image for the image capturing part 214 to capture an image.

The image capturing part 214 is composed of a plurality of light receiving elements arranged on the light receiving surface 215 regularly in a two-dimensional array.

The light receiving elements are imaging devices such as CCDs (charge coupled devices) and CMOSs (complementary metal oxide semiconductors).

The image capturing part 214 captures an optical image (receives light) entering via the lens 212 with an image-capturing field angle within a given range based on control signals from the control part 202, and converts the image signals within the image-capturing field angle to digital data to create a frame.

Furthermore, the image capturing part 214 captures an image and creates a frame in a temporally successive manner, outputs the successive frames to the image processing part 216, and successively stores and updates the frames in the buffer 218.

Furthermore, the image capturing part 214 determines change in the luminance at the same coordinates among a given number of frames.

As a results of the determination, if there is significant change in the luminance to the extent that the luminance is of a first given value or higher in one frame and of a second given value or lower in the subsequent frames, it is assumed that the coordinates have received the modulated light from the transmission part 114.

If there are such coordinates, the image capturing part 214 stores the coordinates ("the bright point coordinates," hereafter) in the given number of frames and a bit data string presenting the mode of temporal luminance change at the coordinates in which "1" indicates that the light is on and "0" indicates that the light is off in the coordinates data list formed in the buffer 218.

The image processing part 216 adjusts the image quality and size of the frame output from the image capturing part 214 based on control signals from the control part 202 in order for the display part 207 to display the frame as a through-the-lens image.

Furthermore, the image processing part 216 has capability of retrieving an optical image within the image-capturing field angle of the image capturing part 214 at the time of a recording command, or an optical image displayed on the display part 207 within the display area, and encoding and filing it using a compression coding scheme such as JPEG (joint photographic expert group) upon receiving control signals based on a recording command operation from the operation part 206.

The decoding part 220 decodes the bit data string presenting the mode of luminance change stored in the coordinates data list within the buffer 218 to digital data based on control signals from the control part 202. The decoding scheme to employ is a scheme corresponding to the encoding scheme used by the encoding/modulation part 110 of the illumination device 100.

The GPS receiver 222 receives signals from a GPS satellite, and measures the location (latitude and longitude) of the portable terminal 200 based on the signals.

The direction sensor 224 detects the direction of photographing by the image capturing part 214 based on change in the geomagnetism.

Detailed structure of the server 300 will be described hereafter.

Figures 4, 5:
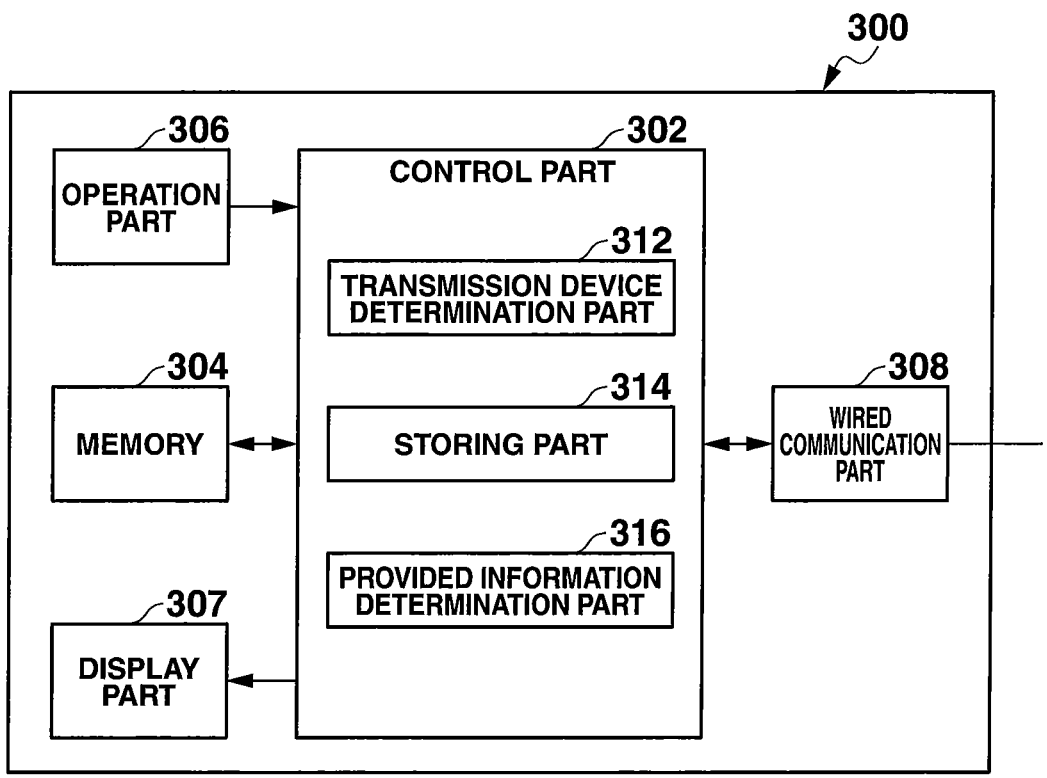
FIG. 4 is an illustration showing an exemplary structure of the server according to Embodiment 1.
FIG. 5 is an illustration showing an example of the device information according to Embodiment 1.

As shown in FIG. 4, the server 300 includes a control part 302, a memory 304, an operation part 306, and a wired communication part 308.

The control part 302 is composed of, for example, a CPU.

The control part 302 has a transmission device determination part 312, a storing part 314, and a provided information determination part 316 for executing software procedures according to programs stored in the memory 304 so as to control various functions of the server 300.

The memory 304 is, for example, a RAM and/or ROM. The memory 304 stores various kinds of information (programs and the like) used for control on the server 300.

The operation part 306 is composed of a numeric keypad and function keys, and serves as an interface for input of operation details from the user.

The display part 307 is composed of, for example, an LCD, PDP, or EL display.

The display part 307 displays images according to image signals output from the control part 302.

The wired communication part 308 is, for example, a LAN card.

The wired communication part 308 communicates with the illumination devices 100 and portable terminals 200 via the communication network 500.

Operation of the information provision system 1 will be described hereafter by way of the first to third operations below.

(First Operation)

The device information as shown in FIG. 5 is prepared for each illumination device 100 and stored in the memory 304 of the server 300 in advance.

The device information is information associating an illumination device 100, a tag ID corresponding to light emitted by the illumination device 100, and the content corresponding to the tag ID.

The device information consists of a device ID of the corresponding illumination device 100, location information of the corresponding illumination device 100 (device location information consisting of the latitude and longitude), a tag ID transmitted by the corresponding illumination device 100 (for example, ID_a in the figure), and data of the content corresponding to the tag ID.

The operator of the server 300 sets a new content.

For example, the operator specifies an illumination device 100 emitting light corresponding to the tag ID corresponding to the new content (an illumination device 100 transmitting the tag ID of the new content) and specifies information on the new content (for example, the file name in the file system and/or the URL) through operation on the operation part 306.

As the operator conducts the operation, as shown in FIG. 6, the server 300 acquires the device information of the illumination device 100 transmitting the tag ID of the new content (Step S101).

In the Step S101, the transmission device determination part 312 of the control part 302 reads the device information corresponding to the illumination device 100 specified by the operator from the memory 304.

Then, the server 300 identifies the tag ID transmitted by another illumination device 100 that is away from the illumination device 100 corresponding to the device information acquired in the Step 101 by a given or longer distance (Step S102).

In the Step S102, the transmission device determination part 312 of the control part 302 extracts the device location information in the device information acquired in the Step S101.

Then, the transmission device determination part 312 extracts the device location information in the device information of the other illumination device 100.

Furthermore, the transmission device determination part 312 calculates the distance between the locations presented by the two pieces of device location information extracted.

If the calculated distance is a given or longer distance (for example, 200 m or longer), the transmission device determination part 312 acquires the tag ID in the device information of the other illumination device 100.

The acquired tag ID is the tag ID transmitted by the other illumination device 100 that is away from the illumination device 100 by a given or longer distance.

Then, the server 300 grants the tag ID identified in the Step S102 to the new content (Step S103).

In the Step S103, the storing part 314 of the control part 302 associates the device information acquired in the Step S101 with the tag ID indentified in the Step S102 and the new content acquired based on the information on the new content specified by the operator, and stores them in the memory 304.

Then, the operation of the information provision system as shown in FIG. 7 is conducted.

The server 300 transmits a tag ID.

The illumination device 100 receives the tag ID (Step S200).

In the Step S200, the control part 302 of the server 300 reads the device information from the memory 304.

Then, the control part 302 determines that the transmission destination of the tag ID in the device information is the illumination device 100 corresponding to the device ID in the device information.

Furthermore, the control part 302 outputs the tag ID to the wired communication part 308, and outputs the IP (Internet protocol) address and MAC (media access control) address corresponding to the illumination device 100 to the wired communication part 308.

The wired communication part 308 transmits the tag ID to the IP address and MAC address corresponding to the illumination device 100 as the destination.

The wired communication part 107 of the illumination device 100 receives the tag ID destined for the IP address and MAC address corresponding to the illumination device 100, and outputs the tag ID to the control part 102.

Then, the illumination device 100 emits light (tag ID light) modulated according to the tag ID and having temporally-changing luminance (Step S201).

In the Step S201, the control part 102 of the illumination device 100 outputs the tag ID consisting of digital data to the encoding/modulation part 110.

The encoding/modulation part 110 encodes the tag ID output from the control part 102 and creates a bit data string, and conducts modulation based on the bit data string.

The drive part 112 generates drive signals corresponding to signals output from the encoding/modulation part 110 and used for changing the luminance of light emitted by the transmission part 114 in a time series manner.

The transmission part 114 emits a tag ID light that is light having the luminance changing in a time series manner in accordance with the drive signals output from the drive part 112.

The user 400 photographs the illumination device 100. Meanwhile, the portable terminal 200 executes a tag ID acquisition and inquiry procedure (Step S202). As shown in FIG. 8, the portable terminal 200 receives light from the illumination device 100 (Step S211).

In the Step S211, the image capturing part 214 of the portable terminal 200 captures an optical image entering via the lens 212 and including a tag ID light, and converts the image signals within the image-capturing field angle to digital data to create a frame.

Furthermore, the image capturing part 214 captures an image and creates a frame in a temporally successive manner, outputs the successive frames to the image processing part 216, and successively stores and updates the frames in the buffer 218.

Then, the portable terminal 200 determines whether a tag ID is received (Step S212).

In the Step S212, if the same coordinates are blinking in a given number of frames, the image capturing part 214 of the portable terminal 200 stores the coordinates of the blinking point (bright point coordinates) and a bit data string presenting the mode of luminance change at the bright point coordinates in the given number of frames in the coordinates data list formed in the buffer 218.

Furthermore, the decoding part 220 decodes the bit data string presenting the mode of luminance change stored in the coordinates data list in the buffer 218 and outputs the decoded data to the control part 202.

The identification information acquisition part 232 of the control part 202 determines that a tag ID is received when the decoded data have the tag ID format.

If a tag ID is received, the portable terminal 200 acquires its own current location and the photographing direction (Step S213).

In the Step S213, the GPS receiver 222 of the portable terminal 200 measures the current location (latitude and longitude) of the portable terminal 200 based on signals from a GPS satellite and outputs it to the control part 202.

The direction sensor 224 detects the direction of photographing by the image capturing part 214 based on change in the geomagnetism and outputs it to the control part 202.

Here, when the illumination device 100 is included in the photographing range of the image capturing part 214, the direction of photographing by the image capturing part 214 is the direction from the portable terminal 200 to the illumination device 100.

The location information acquisition part 234 of the control part 202 acquires the location information of the portable terminal 200 and the direction of photographing by the image capturing part 214.

Then, the portable terminal 200 creates inquiry information (Step S214).

The inquiry information includes, as sown in FIG. 9, the terminal ID (identification information) of the portable terminal 200, acquired location information of the portable terminal 200, photographing direction of the portable terminal 200, and acquired tag ID.

Then, the portable terminal 200 transmits the created inquiry information (Step S215).

Here, in the Step S215, the control part 202 of the portable terminal 200 transmits the inquiry information to the IP address and MAC address corresponding to the server 300 as the destination. Here, the IP address and MAC address may be stored in the memory 204 in advance or may be transmitted from the illumination device 100.

The wireless communication part 208 encodes and modulates the inquiry information destined for the IP address and MAC address corresponding to the server 300 and transmits the radio signals via the antenna 210.

Then, the portable terminal 200 displays indication of the presence of a content and inquiry in process (Step S216).

In the Step S216, the control part 202 of the portable terminal 200 outputs display elements indicating that there is a content and display elements indicating that an inquiry for acquiring the content is in process to the display part 207 for the display part 207 to display them.

Returning to FIG. 7, further explanation will be given.

The server 300 receives the inquiry information (Step S203), and executes an information provision procedure (Step S204).

Figure 10:
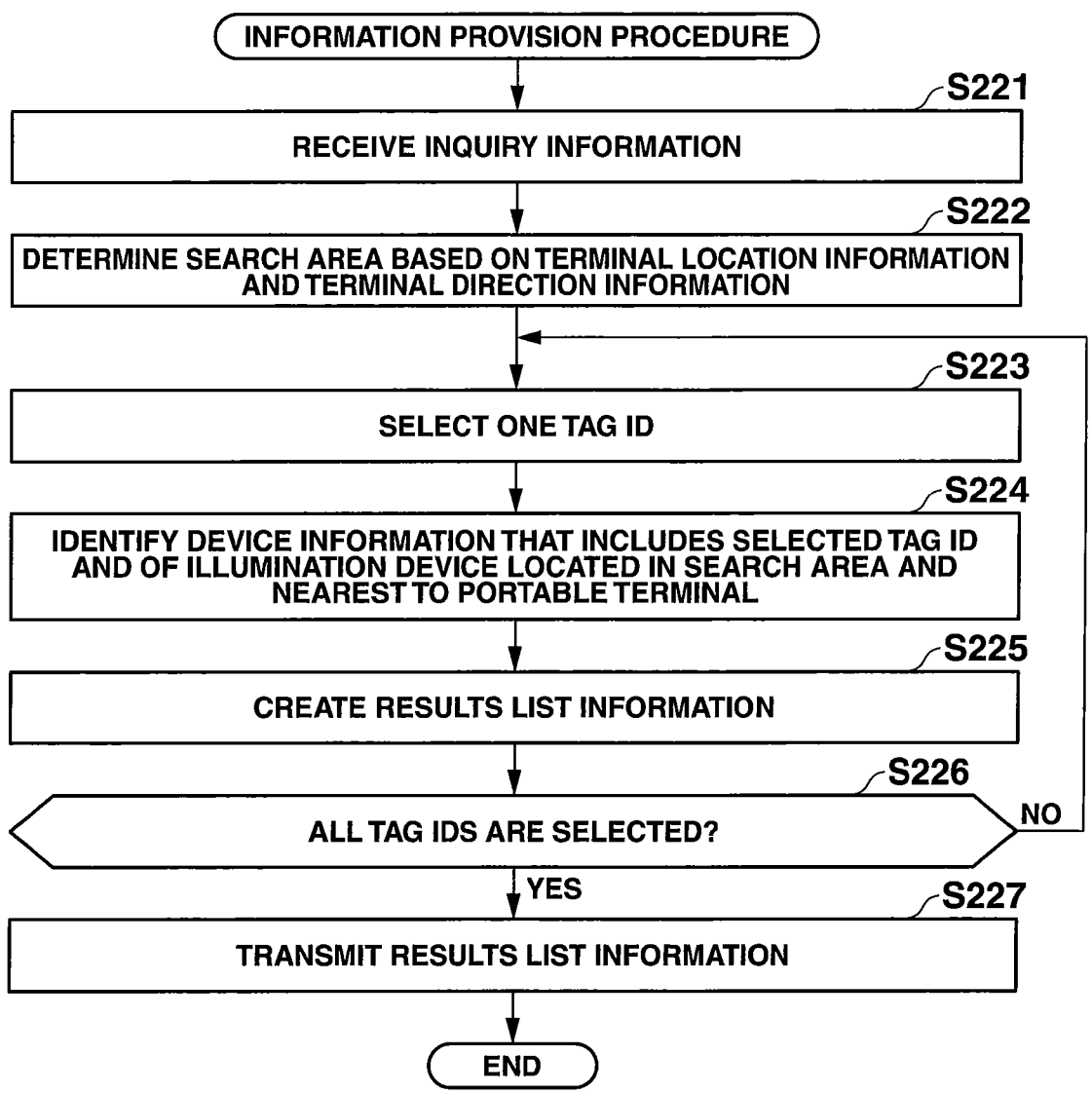
FIG. 10 is a flowchart showing an exemplary operation of the information provision procedure conducted by the server according to Embodiment 1.

As shown in FIG. 10, the server 300 receives the inquiry information from the portable terminal 200 (Step S221).

In the Step S221, the wired communication part 308 of the server 300 receives the inquiry information destined for the IP address and MAC address corresponding to the server 300 and outputs it to the control part 302.

The server 300 determines the search area based on the location information and photographing direction in the received inquiry information (Step S222).

In the Step S222, the provided information determination part 316 of the control part 302 determines an area including the location of the portable terminal 200 presented by the location information and elongated direction presented by the photographing direction to be the search area.

For example, the provided information determination part 316 may determine a combination of the following areas to be the search area as shown in FIG. 11A:
 a circular area 702 around the location 701 of the portable terminal 200; and
 a trapezoidal area 704 elongated from the location 701 of the portable terminal 200 in the arrowed direction 703 that is equal to the direction presented by the terminal direction information and widened in the direction perpendicular to the arrowed direction 703 on either side thereof.

Alternatively, as shown in FIG. 11B, the provided information determination part 316 may determine an elliptic area having one focus at the location 705 of the portable terminal 200 in which the direction from the location 705 to the other location 706 is equal to the direction presented by the terminal direction information and the distance between them is a given distance to be the search area.

The provided information determination part 316 creates search area information consisting of a set of information on the outer edge locations of the search area.

Then, the server 300 selects one tag ID in the received inquiry information (Step S223).

In the Step S223, the provided information determination part 316 of the control part 302 selects one unselected tag ID among the tag IDs in the inquiry information.

Then, the server 300 indentifies the device information that includes the selected tag ID and is of the illumination device 100 present in the search area and nearest to the portable terminal 200 (Step S224).

In the Step S224, the provided information determination part 316 of the control part 302 extracts, of the device information stored in the memory 304, the device information including the selected tag ID.

Then, the provided information determination part 316 identifies, of the extracted device information, the device information of which the device location information indicates a location within the search area.

Furthermore, the provided information determination part 316 identifies, of the identified device information, the device information of which the device location information indicates a location nearest to the location presented by the terminal location information.

Then, the server 300 creates results list information (Step S225).

In the Step S225, the provided information determination part 316 of the control part 302 creates results list information including, as shown in FIG. 12, the tag ID selected in the Step S223 among the tag IDs in the device information identified in the Step S224 and data of the content corresponding to the tag ID.

Then, the server 300 determines whether all tag IDs in the inquiry information are selected (Step S226).

In the Step S226, the provided information determination part 316 of the control part 302 determines whether there is any tag ID unselected in the Step S223 among the tag IDs included in the inquiry information received in the Step S221.

If there is any tag ID unselected, the processing of the Step 223 and subsequent steps is repeated.

On the other hand, if all tag IDs in the inquiry information are selected, the server 300 transmits the results list information (Step S227).

In the Step S227, the provided information determination part 316 of the control part 302 outputs the created results list information to the wired communication part 308, and outputs the IP address and MAC address corresponding to the portable terminal 200 that is the transmitter of the inquiry information received in the Step S221 to the wired communication part 308.

Here, the IP address and MAC address corresponding to the portable terminal 200 are information included as the transmitter of the inquiry information.

The wired communication part 308 outputs the results list information destined for the IP address and MAC address corresponding to the portable terminal 200 to the communication network 500.

Returning to FIG. 7, further explanation will be given.

The portable terminal 200 receives the results list information (Step S205).

In the Step S205, the wireless communication part 208 of the portable terminal 200 receives radio signals via the antenna 210.

Then, the wireless communication part 208 demodulates and decodes the received signals to acquire the result list information.

Furthermore, the wireless communication part 208 outputs the result list information to the control part 202.

Then, the portable terminal 200 displays the content (Step S206).

In the Step S206, the control part 202 of the portable terminal 200 extracts the tag ID and content data corresponding to the tag ID in the input results list information.

Then, the control part 202 determines the position of the illumination device 100 that has transmitted the extracted tag ID among the illumination devices 100 in an image captured by the image capturing part 214 and displayed on the display part 207.

Furthermore, the control part 202 executes a procedure to superimpose and display the content data at the determined position in the image. For this procedure, the technique disclosed in Unexamined Japanese Patent Application Kokai Publication No. 2009-87176 is utilized.

In the first operation, when a new content occurs, the server 300 employs, as a tag ID granted to the content, a tag ID corresponding to light emitted by another illumination device 100 that is away from the illumination device 100 emitting light corresponding to the tag ID by a given or longer distance.

In other words, the illumination devices 100 emitting light corresponding to the same tag ID are away from each other by a given or longer distance, preventing the portable terminal 200 from receiving light corresponding to the same tag ID from a plurality of illumination devices 100 and failing to obtain a unique content. Hence, it is possible to reduce the number of tag IDs and the number of digits in a tag ID and shorten the optical transmission time for transmitting a tag ID.

(Second Operation)

The second operation is different from the first operation in the structure of the device information and part of the tag ID setting operation of the server 300.

The device information as shown in FIG. 13 is prepared for each illumination device 100 and stored in the memory 304 of the server 300 in advance.

The device information consists of a device ID of the corresponding illumination device 100, location information of the corresponding illumination device 100, reachable range information presenting the reachable range of light emitted by the corresponding illumination device 100, a tag ID transmitted by the corresponding illumination device 100, and data of the content corresponding to the tag ID.

The reachable range information consists of a set of information on the outer edge locations of the reachable range.

Here, if there is no tag ID transmitted by the illumination device 100, the device information includes no tag ID and content.

The operator of the server 300 sets a new content.

As in the first operation, the operator specifies an illumination device 100 emitting light corresponding to the tag ID corresponding to the new content and specifies a new content through operation on the operation part 306.

As the operator conducts the operation, as shown in FIG. 14, the server 300 acquires the device information of the illumination device 100 transmitting the tag ID of the new content (Step S301).

In the Step S301, the transmission device determination part 312 of the control part 302 reads the device information corresponding to the illumination device 100 specified by the operator from the memory 304.

Then, the server 300 identifies the tag ID transmitted by another illumination device 100 of which the light-reachable range does not overlap with that of the illumination device 100 corresponding to the device information acquired in the Step S301 (Step S302).

In the Step S302, the transmission device determination part 312 of the control part 302 extracts the device reachable range information in the device information acquired in the Step S301.

Then, the transmission device determination part 312 extracts the reachable range information in the device information of the other illumination device 100.

Furthermore, the transmission device determination part 312 identifies the two light-reachable ranges presented by the two pieces of reachable range information extracted. Then, the transmission device determination part 312 determines whether the two light-reachable ranges overlap with each other.

If the two light-reachable ranges do not overlap with each other, the transmission device determination part 312 acquires the tag ID in the device information of the other illumination device 100.

The acquired tag ID is the tag ID transmitted by the other illumination device 100 of which the light-reachable range does not overlap with that of the illumination device 100.

Then, the server 300 grants the tag ID identified in the Step S302 to the new content (Step S303).

In the Step S303, the storing part 314 of the control part 302 associates the device information acquired in the Step S301 with the tag ID identified in the Step S302 and data of the new content acquired based on the information on the new content specified by the operator and stores them in the memory 304.

In the second operation, when a new content occurs, the server 300 employs, as a tag ID granted to the content, a tag ID corresponding to light emitted by another illumination device 100 of which the light-reachable range does not overlap with that of the illumination device 100 emitting light corresponding to the tag ID.

In other words, the illumination devices 100 emitting light corresponding to the same tag ID are at locations where their light-reachable ranges do not overlap with each other, preventing the portable terminal 200 from receiving light corresponding to the same tag ID from a plurality of illumination devices 100 and failing to obtain a unique content.

Hence, it is possible to reduce the number of tag IDs and the number of digits in a tag ID and shorten the optical transmission time for transmitting a tag ID.

(Third Operation)

In the third operation, the portable terminal 200 receives light corresponding to the same tag ID from a plurality of illumination devices 100.

In the third operation, the portable terminal 200 creates inquiry information different from the one in the first and second operations and transmits it to the server 300. More specifically, the control part 202 of the portable terminal 200 creates inquiry information including, as shown in FIG. 15, a terminal ID that is the identification information of the portable terminal 200, acquired latitude and longitude information (terminal location information) of the portable terminal 200, information of the direction from the portable terminal 200 to the illumination device 100 (terminal direction information), an acquired tag ID (tag ID_a), and positions on the light receiving surface 215 of the image capturing part 214 at which light corresponding to the tag ID (tag ID_a) is received (light reception position information $\alpha, \beta$).

The light reception position information consists of a set of X-coordinate and Y-coordinate of the light reception position provided that the light receiving surface 215 forms a X-Y plane.

The light reception position information acquisition part 236 of the control part 202 monitors the light reception position on the light receiving surface 215 of light corresponding to the tag ID, and creates light reception position information corresponding to the light reception position.

The portable terminal 200 transmits the created inquiry information.

The server 300 receives the inquiry information and executes an information provision procedure.

Figure 16:
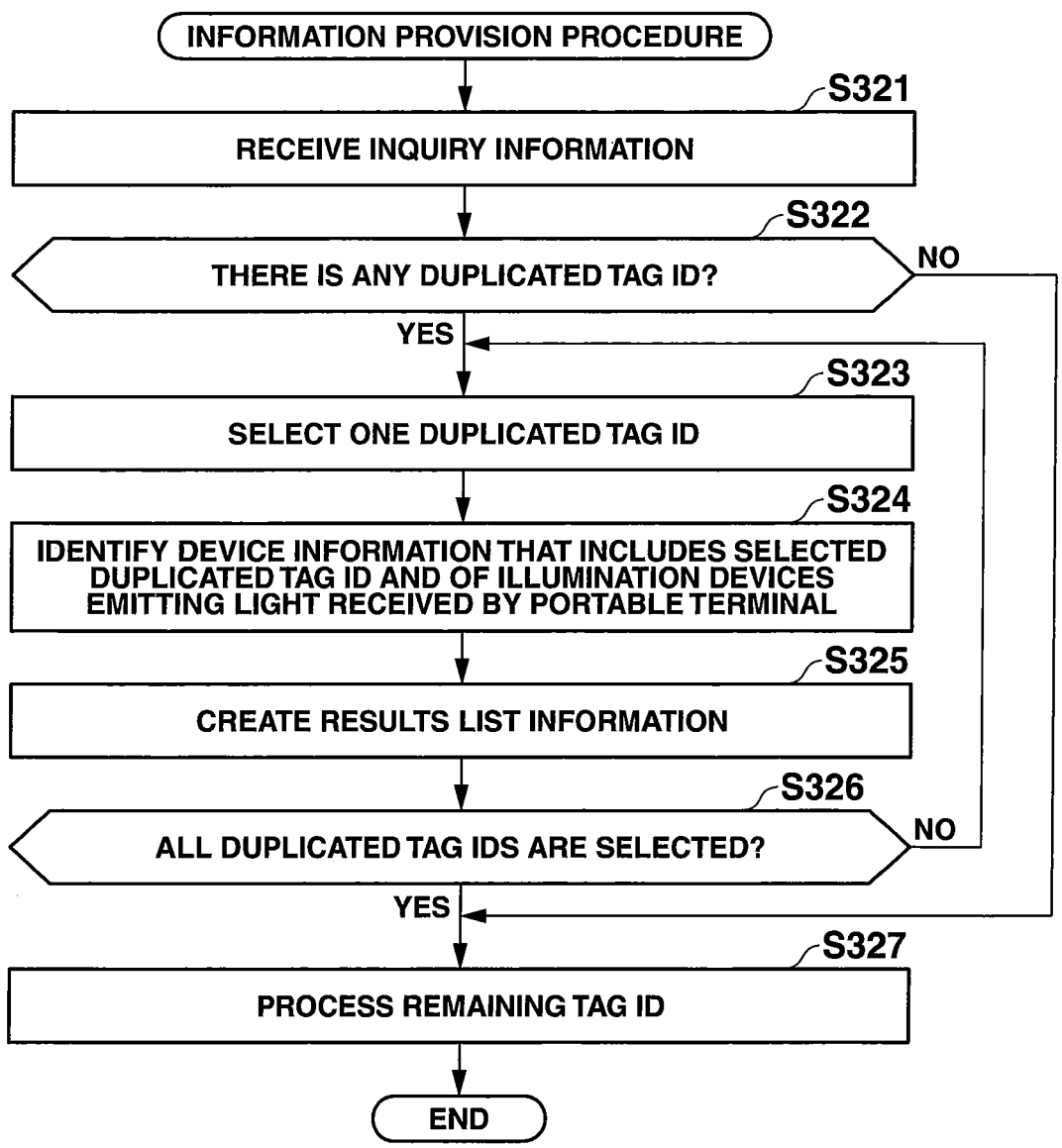
FIG. 16 is a flowchart showing an exemplary operation of the information provision procedure conducted by the server according to Embodiment 1.

As shown in FIG. 16, the server 300 receives the inquiry information from the portable terminal 200 (Step S321).

The same specific operation as in the Step S221 of FIG. 10 is conducted.

The server 300 determines whether there is a tag ID duplicated (a duplicated tag ID) in the received inquiry information (Step S321).

In the Step S321, if the inquiry information includes a plurality of identical tag IDs, the provided information determination part 316 of the control part 302 determines that the tag ID is a duplicated tag ID.

If there is a duplicated tag ID, the server 300 selects one duplicated tag ID (Step S323).

In the Step S323, the provided information determination part 316 of the control part 302 selects one unselected duplicated tag ID among the duplicated tag IDs in the inquiry information.

Then, the server 300 indentifies the device information that includes the selected duplicated tag ID and of the illumination device 100 emitting the light received by the portable terminal 200 (Step S324).

In the Step S324, the provided information determination part 316 of the control part 302 extracts, of the device information stored in the memory 304, the device information including the selected duplicated tag ID.

Then, the provided information determination part 316 determines the range of photographing by the image capturing part 214 of the portable terminal 200 in the real space based on the terminal location information and terminal direction information in the inquiry information.

Consequently, the position on the light receiving surface 215 is associated with the location in the real space.

Furthermore, the provided information determination part 316 associates the position presented by the light reception position information in the inquiry information (the light reception position) with the location in the real space presented by the device location information in the extracted device information in the same manner as the position on the light reception surface 215 is associated with the location in the real space.

If the light reception position on the light receiving surface 215 presented by the light reception position information is associated with the location in the real space presented by the device location information, the provided information determination part 316 determines that the illumination device 100 present at the location in the real space presented by the device location information is the illumination device 100 that has emitted the light received at the light reception position on the light receiving surface 215 presented by the light reception position information, and identifies the device information including the device location information.

Figure 17A:
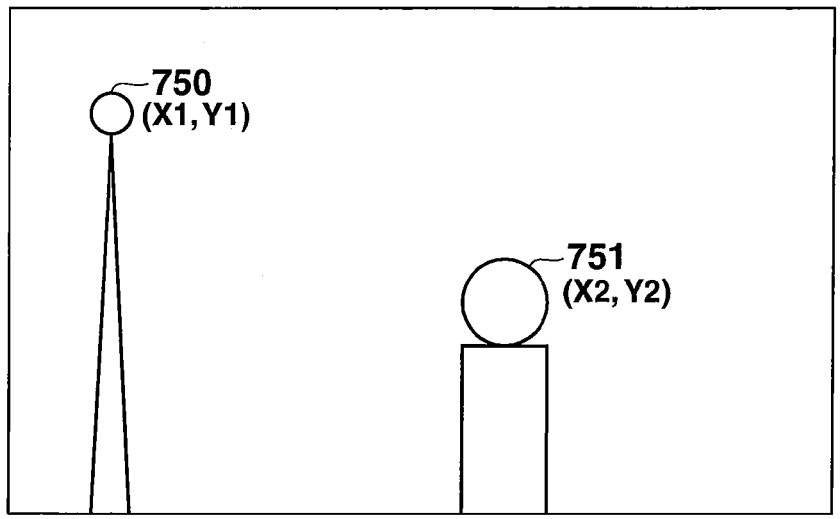
FIG. 17A is an illustration showing an exemplary correspondence between the light reception position and illumination device location according to Embodiment 1, showing the duplicated tag ID light reception positions in an image-capturing range.
Figure 17B:
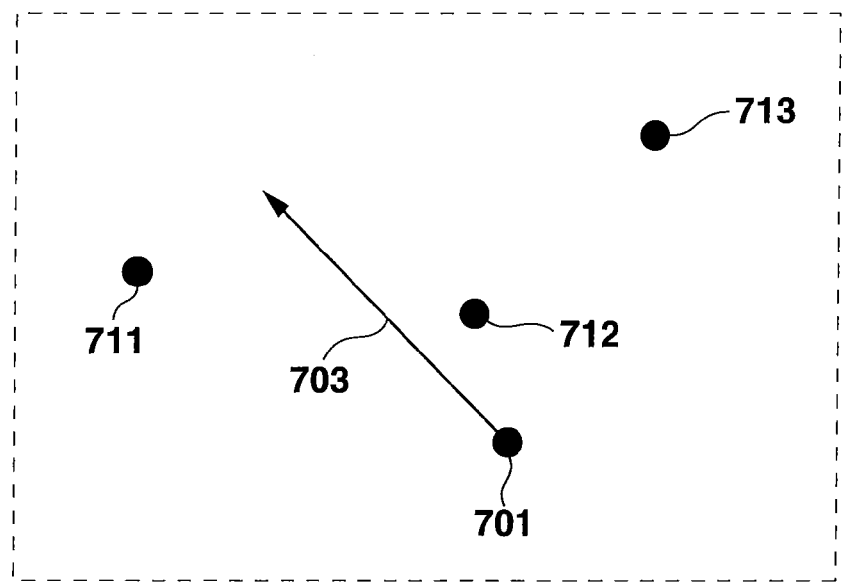
FIG. 17B is an illustration showing the relationship among the portable terminal location, photographing direction, and locations of the illumination devices emitting a duplicated tag ID.

For example, it is assumed that the light reception position information corresponding to a duplicated tag ID presents light reception positions 750 (X1, Y1) and 751 (X2, Y2) as shown in FIG. 17A, and the location 701 of the portable terminal 200, direction 703 of photographing by the image capturing part 214 of the portable terminal 200, locations 711, 712, and 713 in the real space of the illumination devices 100 emitting light corresponding to the duplicated ID are identified as shown in FIG. 17B.

In such a case, the provided information determination part 316 associates the light reception position 750 (X1,Y1) with the location 711 of the illumination device 100 in the real space and determines that the illumination device 100 present at the location 711 has emitted light corresponding to the light reception position 750 (X1, Y1).

Furthermore, the provided information determination part 316 associates the light reception position 751 (X2, Y2) with the location 712 of the illumination device 100 in the real space and determines that the illumination device 100 present at the location 712 has emitted light corresponding to the light reception position 751 (X2, Y2).

Here, if the device location information in the device information includes altitude information on the illumination device 100, the provided information determination part 316 can associate the light reception position with the altitude to identify the device information of the illumination device 100 that has emitted the light received by the portable terminal 200 with higher accuracy.

Then, the server 300 creates results list information (Step S325).

In the Step S325, the provided information determination part 316 of the control part 302 creates results list information including, as shown in FIG. 18, the tag ID (ID_a) selected in the Step S323, light reception position information corresponding to the tag ID (α), and content corresponding to the tag ID.

Then, the server 300 determines whether all duplicated tag IDs (ID_a in FIG. 18) in the inquiry information are selected (Step S326).

In the Step S326, the provided information determination part 316 of the control part 302 determines whether there is any duplicated tag ID unselected in the Step S323 among the duplicated tag IDs included in the inquiry information received in the Step S321.

If there is any duplicated tag ID unselected, the processing of the Step 323 and subsequent steps is repeated.

On the other hand, if all duplicated tag IDs in the inquiry information are selected, the server 300 processes the remaining tag IDs (Step S327).

The remaining tag IDs are processed in the procedure shown in FIG. 10.

In the third operation, if the portable terminal 200 received light corresponding to the same tag ID from a plurality of illumination devices 100, the portable terminal 200 informs the server 300 of the light reception position information on the light receiving surface 215.

On the other hand, the server 300 is capable of identifying a plurality of illumination devices 100 emitting light corresponding to the same tag ID based on the light reception position information, and further capable of transmitting data of different contents with the same tag ID to the portable terminal 200.

Therefore, it is possible to reduce the number of tag IDs and the number of digits in a tag ID and shorten the optical transmission time for transmitting a tag ID.

Embodiment 2

The information provision system and information provision method according to Embodiment 2 of the present invention will be described hereafter with reference to the drawings.

This embodiment utilizes, instead of modulated light from the illumination devices 100, modulation with color change in the terminal devices 200-1 and 200-2 (or the terminal devices 200-3 and 200-4) for information transfer.

In the flowing explanation, the same structures as in Embodiment 1 are referred to by the same reference numbers and their explanation will be omitted.

Figure 19:
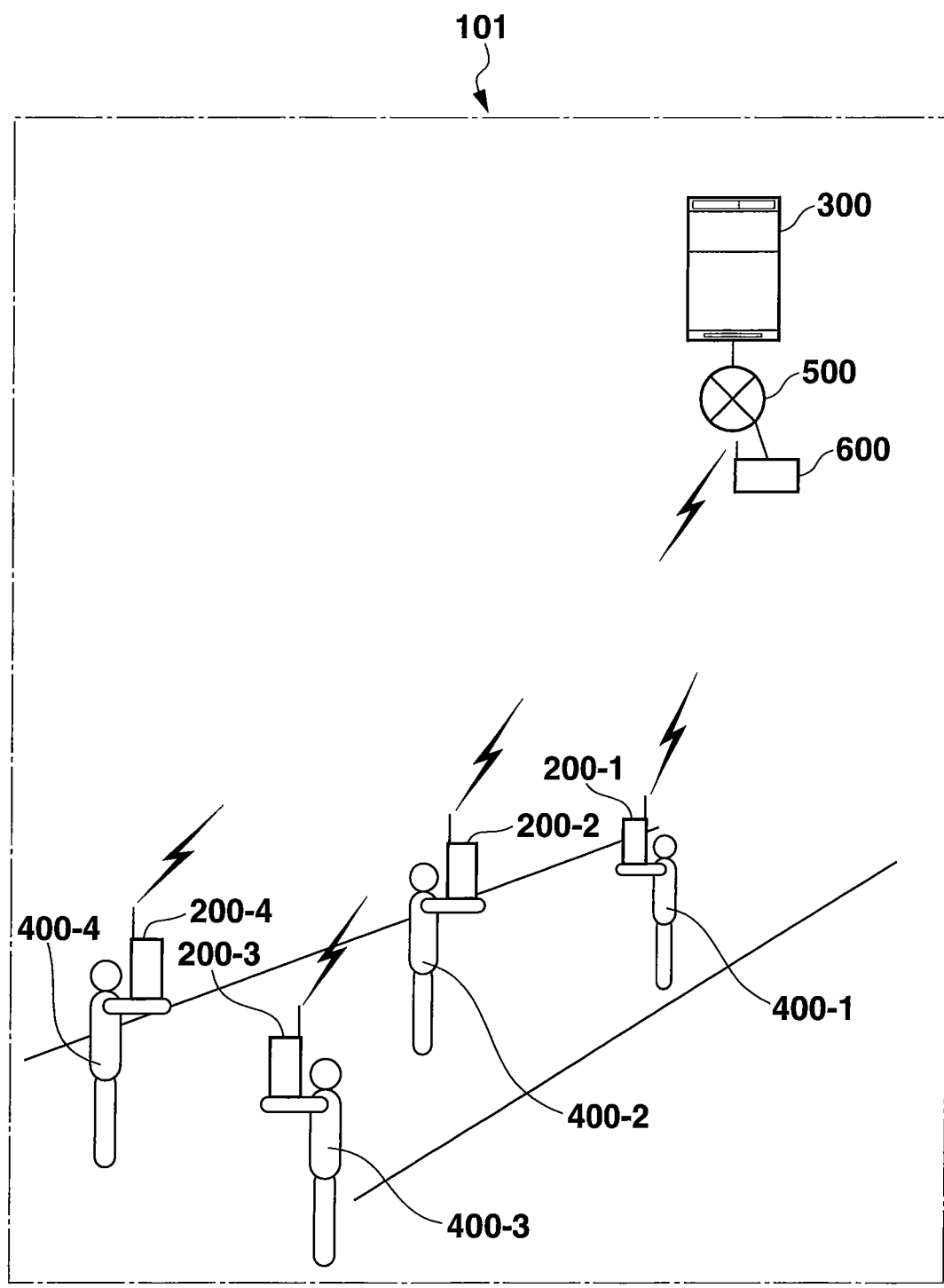
FIG. 19 is an illustration showing an exemplary configuration of portable terminals and a server constituting the information provision system according to Embodiment 2 of the present invention.

As shown in FIG. 19, an information provision system 101 is configured to include portable terminals 200 as terminal devices and a server 300 with no illumination device 100.

A portable terminal 200 itself also serves as an illumination device (transmission device) in addition to conducting the same operations as in the above Embodiment 1. More specifically, the display part 207 of the portable terminal 200 functions as the transmission part 114 in the above Embodiment 1.

In other words, with the display part 207 facing the portable terminal 200 of the transmission destination, the portable terminal 200 transmits user profile data and/or text messages and images (CG) replaced with a tag ID as a content to the portable terminal 200 of the transmission destination using a marker display by means of modulation with time series wavelength (color) change.

The server 300 communicates with the portable terminals 200 via the communication network 500 and wireless base station 600.

The server 300 supervises the contents (the users' own profile data and/or text messages and images transmitted by the users 400 through operation on the portable terminals 200) and tag IDs, and transmits the content corresponding to the tag ID transmitted from a portable terminal 200 to the portable terminal 200.

The portable terminals 200 in this embodiment have the same basic structure as in Embodiment 1.

However, in this embodiment, the control part 202 also functions as part of the control part 102 in the above Embodiment 1. Furthermore, the memory 204 stores some of the programs stored in the memory 104 in the above Embodiment 1.

The operation part 206 is composed of a numeric keypad and function keys, and, in this embodiment, a transparent touch-panel mounted on the display surface of the display part 207, and serves as an interface for input of operation details from the user.

The display part 207 is composed of, for example, an LCD, PDP, or EL display. The display part 207 displays images (for example, through-the-lens images described later) in color according to image signals output from the control part 202.

Furthermore, the display part 207 has a built-in driver. The driver serves as the encoding/modulation part 110 in the above Embodiment 1.

The encoding/modulation scheme is described in Unexamined Japanese Patent Application Nos. 2011-139213 and 2011-139233 filed by the applicant of this application. More specifically, the tag ID to be transferred is specified by a color changing among a plurality of colors in a time series manner and the color change is expressed by a marker displayed on the display part 207 to transmit the tag ID.

Operation of the information provision system 101 will be described hereafter.

Instead of the device information as shown in FIG. 5 of the above Embodiment 1, the memory 304 of the server 300 stores a table in which 64 to 128 (up to 7 bits excluding the header code) tag IDs are assigned to each region code that is uniquely assigned to one unit region obtained by zoning the entire region in a lattice pattern.

Contents are assigned to the tag IDs for a given time period based on information transmitted from the portable terminals 200, which is described later.

Figure 20:
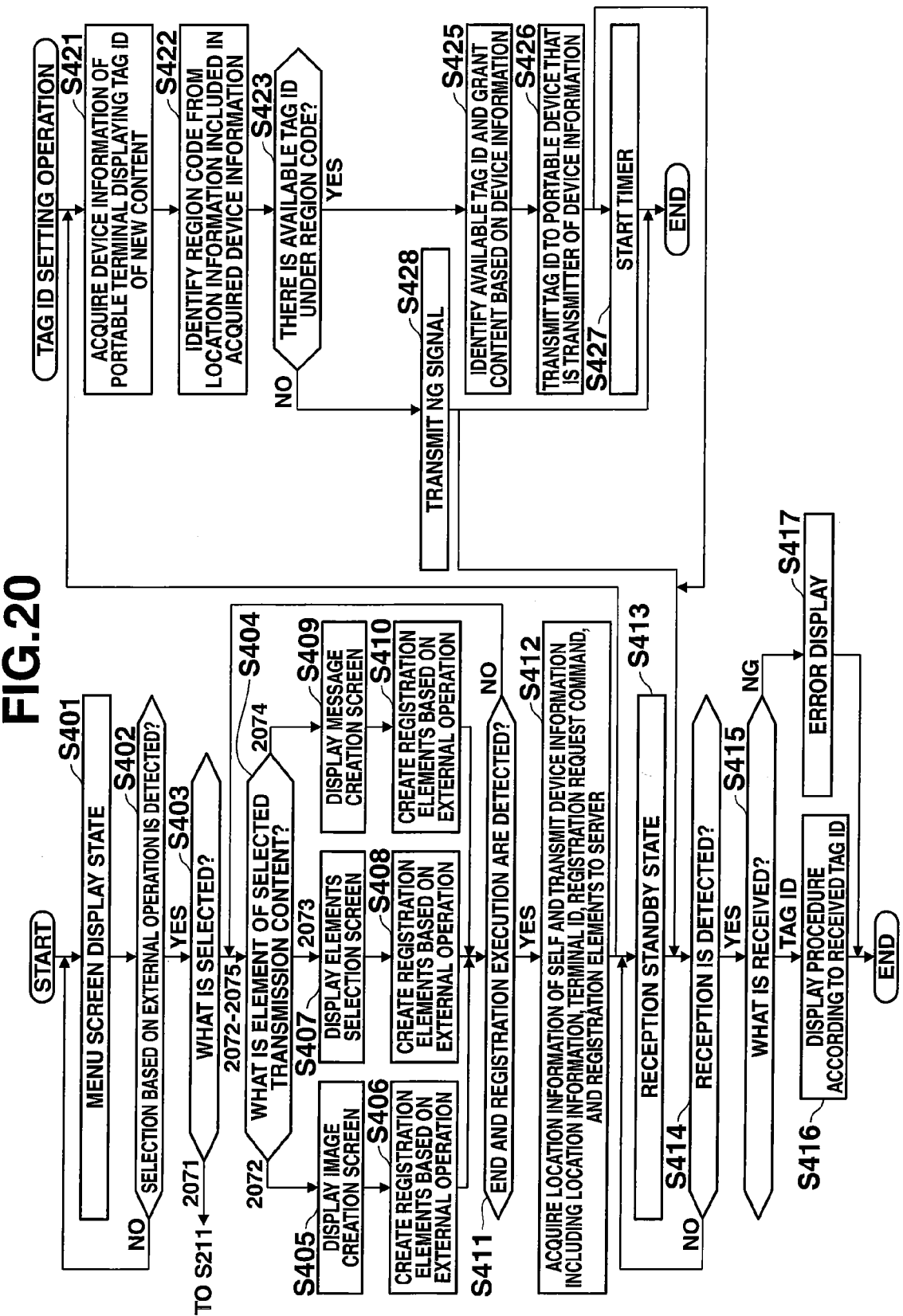
FIG. 20 is a flowchart of an exemplary operation of the tag ID setting conducted by the server according to Embodiment 2.

With reference to the flowchart of FIG. 20, a user 400 sets a new content to transmit to the other party.

The content setting operation is realized by the control part 202 executing content-creating/setting programs stored in the memory 204.

Figure 21:
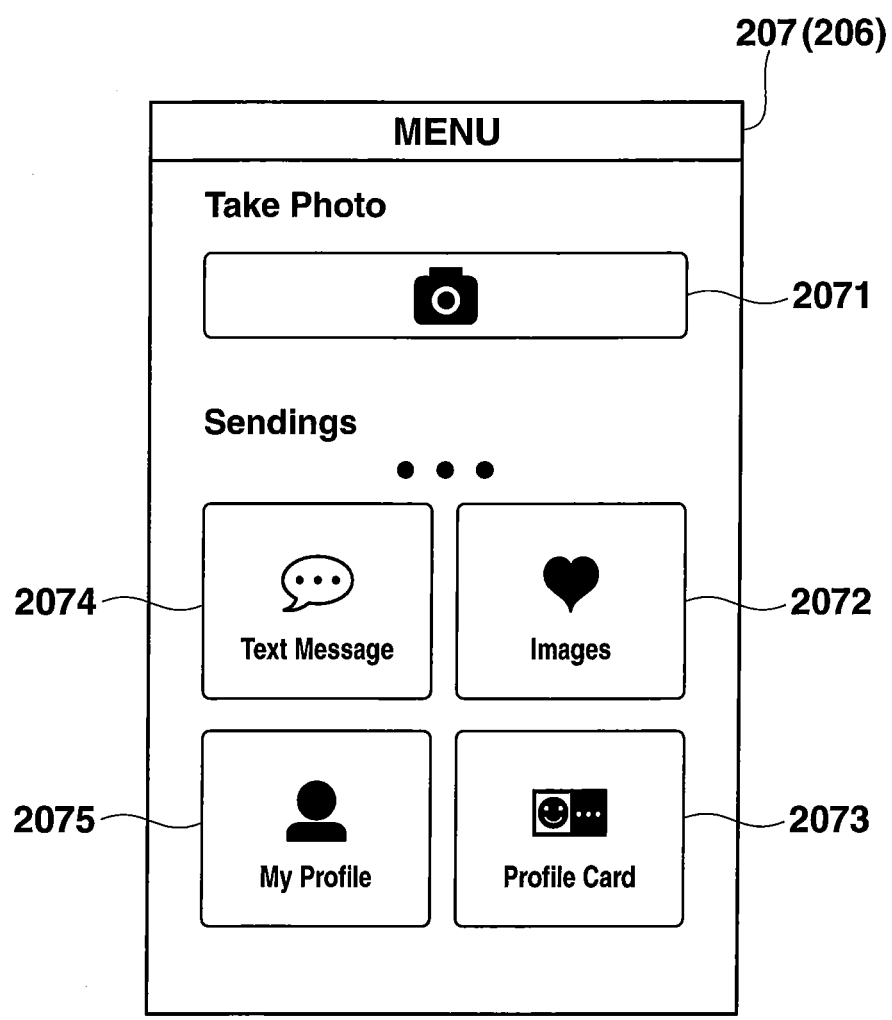
FIG. 21 is an illustration showing an exemplary display of the portable terminal according to Embodiment 2.

At the beginning of the setting operation, a menu screen as shown in FIG. 21 is displayed on the display part 207 of the portable terminal 200 (Step S401). In FIG. 21, the characters "MENU" and "Take Photo" and a camera icon 2071 are displayed on the display part 207.

Then, as touch of a finger of the user 400 on the camera icon 2071 is detected through the touch panel 206 mounted on the display surface of the display part 207, the portable terminal 200 activates the image capturing part 214 and executes a procedure to receive a tag ID transmitted with time series emission color change.

Furthermore, the characters "Sendings" and, below them, icons 2072 to 2075 representing the elements of contents to be transmitted are displayed.

Then, as touch of a finger of the user 400 on any of the icons 2072 to 2075 is detected through the touch panel 206 mounted on the display surface of the display part 207, the following procedures assigned to the icons 2072 to 2075 are executed.

Icon 2072

Displaying, on the display part of the portable terminal 200 having received the tag ID, a screen for selecting an image (CG: computer graphic) to be superimposed on and mixed with the live view image successively captured by the image capturing part 214 of the portable terminal 200 (or a recorded image) as a content to transmit.

Icon 2073

Figure 22:
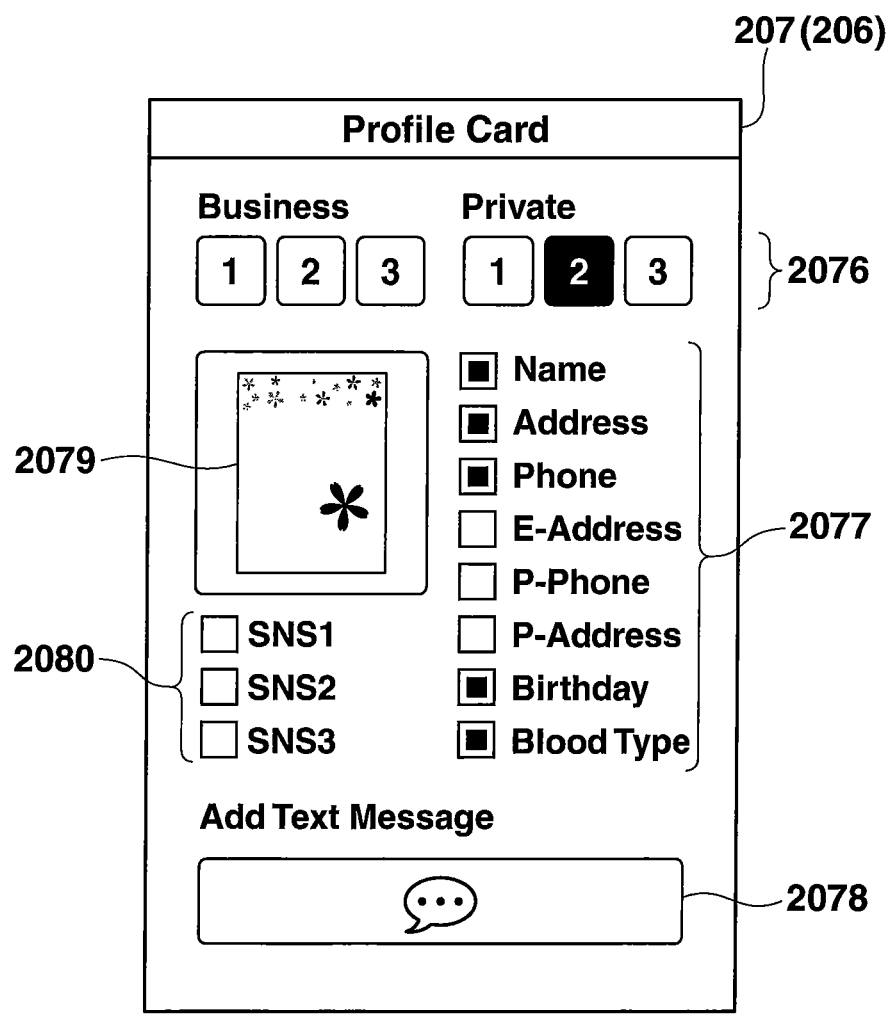
FIG. 22 is an illustration showing an exemplary display of the portable terminal according to Embodiment 2.

Display a profile card of the user 400 as shown in FIG. 22 that is stored in a given memory region of the control part 202 of the portable terminal 200 in advance as a content to transmit.

Icon 2074

Displaying, on the display part of the portable terminal 200 having received the tag ID, a screen for creating a text message with a speech balloon to be superimposed on and mixed with the live view image successively captured by the image capturing part 214 of the portable terminal 200 (or a recorded image) as a content to transmit.

Icon 2075

Displaying the profile data of the user 400 that are stored in a given memory region of the control part 202 of the portable terminal 200.

In the state of display of FIG. 21, it is determined whether selection operation for selecting any of the camera icon 2071 and icons 2072 to 2075 is detected based on external operation of the user 400 (Step S402).

If no selection operation is detected in the Step S402 (Step S402; No), the display of the menu screen in the Step S401 is kept. On the other hand, if any selection operation is detected in the Step S402 (Step S402; Yes), it is determined which icon, or which procedure, is selected (Step S403).

If it is determined that the camera icon 2071 is selected, proceeds to the procedure in the Step S211 of FIG. 8.

However, in this embodiment, in the Step S212, if there is color change at the same coordinates in a given quantity of frames, the image capturing part 214 of the portable terminal 200 stores the coordinates where the color change occurs and a bit data string presenting the mode of time series color change at the coordinates in a given quantity of frames in the coordinates data list formed within the buffer 218.

Furthermore, the decoding part 220 decodes the bit data string presenting the mode of color change stored in the coordinates data list within the buffer 218, and outputs the decoded data to the control part 202.

The identification information acquisition part 232 of the control part 202 determines that a tag ID is received when the decoded data have the tag ID format (the detailed processing is described in Unexamined Japanese Patent Application Nos. 2011-139213 and 2011-139233 filed by the applicant of this application).

On the other hand, if the selected icon is any of the icons 2072 to 2074 in the Step S403, it is determined which one the selected icon or the transmission content element is: an image (icon 7072), profile card (icon 2073), or text message (icon 2074) (Step S404).

Here, if the icon 2075 is selected in the Step S404, a known profile data edit procedure is executed.

If an image is selected as the transmission content element in the Step S404, a screen for creating the image is displayed on the display part 207 (Step S405).

Then, any operation by the user 400 is received at the operation part 206 and an image to be registered in the server 300 is created based on the operation details.

On the other hand, if a profile card is selected as the transmission content element in the Step S404, a screen for creating the profile card is displayed on the display part 207 (Step S407).

FIG. 22 shows a display pattern on the display part 207 in the Step S407. Elements of a "Profile Card" displayed on the display part 207 in this figure are as follows.

A Set of Icons 2076

Icons presenting the attribute of the profile card.

In this embodiment, three patterns for "Business" and three patterns for "Private" are prepared.

According to the highlighted number in the set of icons 2076, options for the profile data of the user 400, or the elements of a content to be registered, and the display layout to be displayed on the portable terminal 200 of the transmission destination are displayed below the number.

A Set of Profile Data Check Boxes 2077

Those present profile data options to be included in the profile card of the user 400 to be registered as a content. The item having the left check box highlighted in black is included in the profile card.

Furthermore, the selection is made by the user 400 touching the input part (touch panel) 206 with a finger.

In more details, the check box where touch is detected is repeatedly highlighted/unhighlighted each time touch is detected and accordingly switched between selected and non-selected.

In this way, the profile data of the user 400 to be included in a profile card can easily be set according to the attribute of the profile card.

Text Message Icon 2078

Upon detection of the operation (touch), this icon enables typing of a simple message for including a simple text message as a content together with the profile data.

Display Layout Image 2079

Presenting the elements to be displayed based on the elements of a content returned from the server 300 after the reception portable terminal 200 receives change in the light displayed on the display part 207 of the transmission portable terminal 200, decodes the change to the corresponding tag ID, and transmits the tag ID and its own location information to the server 300.

However, the elements displayed in the display layout image 2079 are simplified, low-resolution ones obtained from actual display elements. It is intended only for checking on "what elements are displayed on the portable terminal 200 of the other party."

A Set of SNS Check Boxes 2080

Presenting SNS (social network services) options to which the user 400 to be registered as a content belongs. The item with the left check box highlighted in black is included in the profile card.

Here again, the selection is made by the user touching the input part (touch panel) 206 with a finger.

In more details, the check box where touch is detected is repeatedly highlighted/unhighlighted each time touch is detected and accordingly switched between selected and non-selected.

In this way, the SNS (more specifically, the URL of a user page of the SNS) to which the user 400 to be included in a profile card belongs can easily be set according to the attribute of the profile card.

Any operation by the user 400 on the above display screen is received at the operation part 206 and a profile card to be registered in the server 300 is created based on the operation details (Step S408).

Furthermore, if a message is selected as the transmission content element in the Step S404, a screen for creating the message is displayed on the display part 207 (Step S409).

Figure 23:
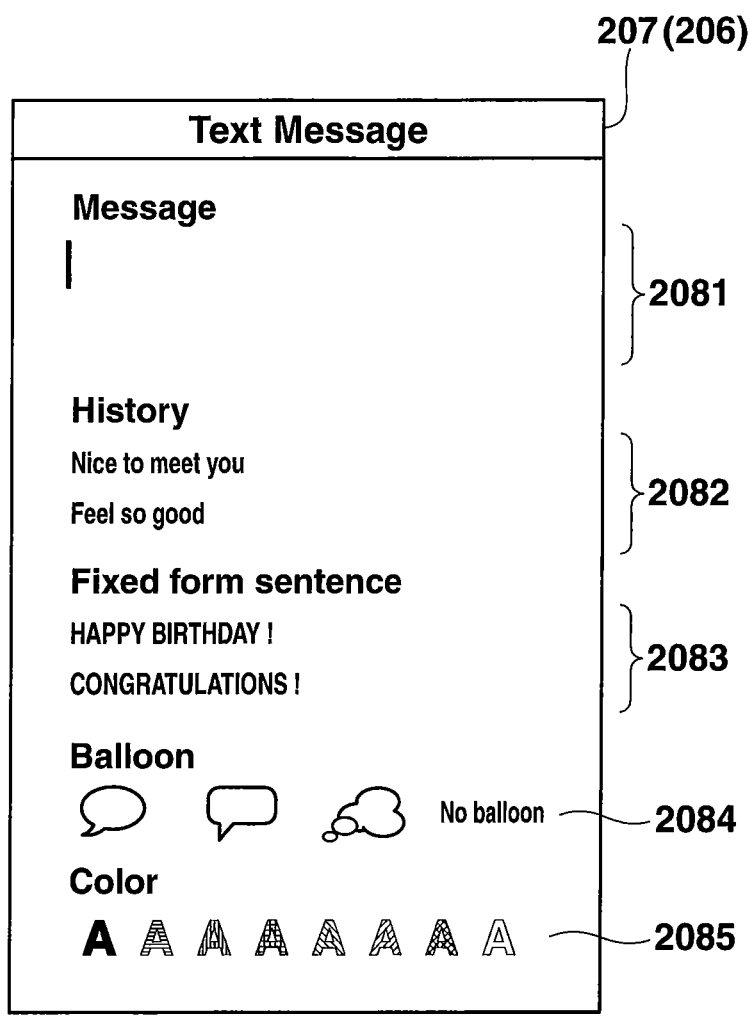
FIG. 23 is an illustration showing an exemplary display of the portable terminal according to Embodiment 2.

FIG. 23 shows a display pattern on the display part 207 in the Step S409. The elements of the "Text Message" displayed on the display part 207 in this figure are as follows.

Message Input Form 2081

An input field for typing any message.

History Display Field 2082

Displaying messages entered/created in the past and registered in the server 300.

For displaying some messages entered/created in the past as history, their history should be stored in the memory 204 of the portable terminal 200.

On the other hand, for displaying some messages registered in the server 300 in the past as history, a request for transmitting the messages registered in the past and supervised as history should be made to the server 300 before this screen is displayed.

Template Messages Display Field 2083

Displaying several default message patterns.

The messages may be written in the program in advance or prepared by the server 300.

Speech Balloon Patterns Display Field 2084

The entered/created message can be superimposed on a speech balloon pattern (CG) representing "opinion" or "feeling" in comics according to the preference of the user 400 for displaying it in the live view image (or a recorded image) on the portable terminal of the other party.

In this field, several kinds of speech balloon patterns are displayed and selected by the user 400 through selection operation.

Text Color Selection Field 2085

The entered/created message can be changed in display color according to the preference of the user 400.

In this field, several color patterns are displayed and selected by the user 400 through selection operation.

Any operation by the user 400 on the above display screen is received at the operation part 206 and a message to be registered in the server 300 is created based on the operation details (Step S410).

Subsequently, it is determined whether the creation of a selected content is completed and a command to execute registration in the server 300 is detected (Step S411).

If it is No in the Step S411, the control part 202 returns to the Step S404. On the other hand, if it is Yes, the control part 202 activates the GPS receiver 222 and acquires the location information of the portable terminal 200.

Then, the control part 202 transmits to the server 300 the terminal ID that is unique ID information for distinguishing the portable terminal 200 itself from another portable terminal 200, a registration request command indicating that the transmission element from the portable terminal 200 to the server 300 is a request to register a new content, and the content elements entered/created in the Steps 405 to 410 (Step S412), and shifts to a reception standby state for receiving the result as to whether the registration was successful (Step S413).

Here, the processing of the server 300 upon receiving the elements transmitted in the processing of the Step S412 is described.

This processing of the server 300 is nearly the same as the tag ID setting operation (FIGS. 6 and 14) in the above Embodiment 1. This embodiment employs the processing (process) of the Steps S421 to S427 in FIG. 20.

As shown in the figure, the server 300 acquires the device information of the portable terminal 200 transmitting a tag ID of the new content (Step S421).

In more details, detecting a registration request command transmitted by the portable terminal 200 in the Step S412 and included in the received device information, the server 300 determines that a request for registering a new content and transmitting a tag ID is made and then detects the terminal ID included in the received device information to identify the portable terminal 200 that has made the request.

Then, the server 300 detects the location information of the portable terminal included in the acquired device information, determines in which region the location information is included, and as a result of the determination, identifies the region code corresponding to the region including it (Step S422).

Then, it is determined whether there is a tag ID to which there is no corresponding content registered, or whether there is an available tag ID, among a plurality of tag IDs assigned to the identified region code (Step S423).

As a result of the above determination, if there is an available tag ID (Step S424; Yes), the server 300 identifies the available tag ID, grants the content included in the received device information to the available tag ID, and stores the available tag ID in the memory 304 (Step S425).

Then, the server 300 transmits the tag ID to the portable terminal 200 that has transmitted the device information (Step S426), and starts a timer set for a given time period (for example, 10 minutes) (Step S427).

The reason that a given time period is set in the Step S427 is not to use up the tag IDs due to excessive registration.

However, if the number of tag IDs controllable under one region code is much greater than the number of registration requests from the portable terminals 200, the processing in the Step S427 is unnecessary.

On the other hand, if there is no available tag ID (Step S424; No), the server 300 transmits an NG signal indicating that there is no tag ID to be assigned to the content to the portable terminal that has made the content registration request (Step S428).

The available tag ID is identified, the content included in the received device information is granted, and stored in the memory 304 (Step S425).

Then, the tag ID is transmitted to the portable terminal 200 that has transmitted the device information (Step S426), and a timer set for a given time period (for example, 10 minutes) is started (Step S427).

On the other hand, the portable terminal 200 in the reception standby state in the Step S413 periodically determines whether it has received a signal transmitted to itself from the server 300 (Step S414).

If the portable terminal 200 does not detect a signal transmitted to itself (Step S414; No), it returns to the reception standby state in the Step S413. If the portable terminal 200 detects a signal transmitted to itself (Step S414; Yes), it is determined whether the element of the received signal is a tag ID or an NG (Step S415).

If the element of the received signal is a tag ID, the portable terminal 200 receiving the signal modulates the received tag ID to a display element that changes in color in a time series manner, and executes a procedure to display the display element that changes in color in a time series manner on the display part 207 (Step S416).

Figure 24:
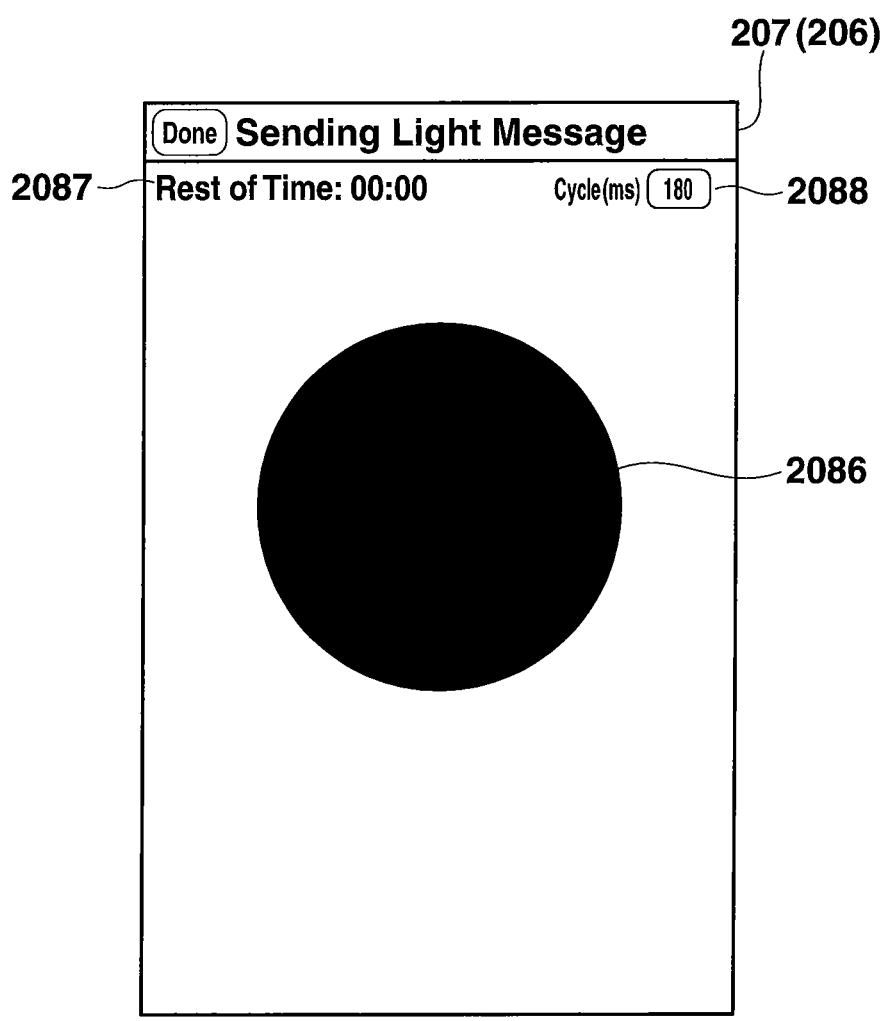
FIG. 24 is an illustration showing an exemplary display of the portable terminal according to Embodiment 2.

FIG. 24 shows an exemplary display on the display part 207 in the above case.

In the figure, a large circular spot nearly at the center of the display part 207 is a marker 2086, which changes in color in a time series manner (namely, a spot transmitting a tag ID).

Furthermore, in the figure, the remaining time 2087 in the given time period described with respect to the Step S427 and supervised by the server 300 and a color change period count cycle 2088 is also displayed.

On the other hand, if the element of the received signal is an NG, a procedure to display an error message on the display part is executed (Step S417).

With the above processing, the server 300 associates, stores, and supervises a tag ID and content in response to a content registration request from a portable terminal 200 and transmits the associated tag ID to the portable terminal 200 that has made the request to register the content.

Then, the portable terminal 200 receiving the tag ID converts the received tag ID to a display element that changes in color in a time series manner and executes the display procedure using the display part 207.

Furthermore, if the image capturing part 214 of another portable terminal 200 successively captures images of the display element, the portable terminal 200 decodes the tag ID and transmits it to the server 300 together with its own location information. The server 300 identifies the region the portable terminal 200 belongs to from the received location information, finds out the region code, reads the content registered in association with the tag ID received in the region controlled under this region code, and transmits it to the other portable terminal 200.

Figure 25:
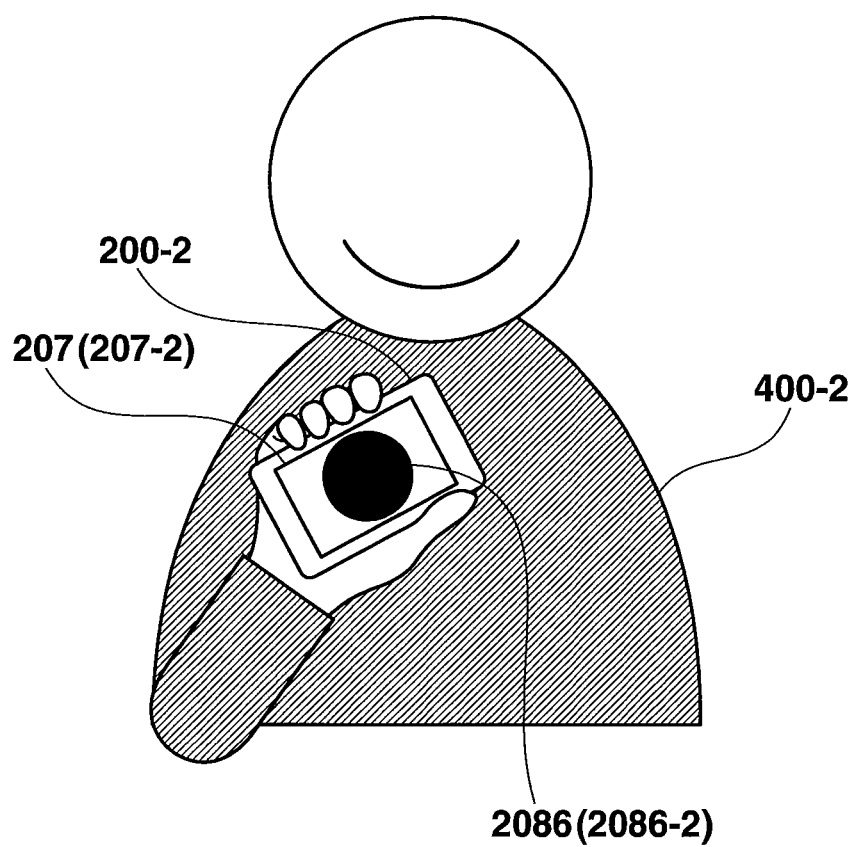
FIG. 25 is an illustration showing a photographed user and his/her portable terminal according to Embodiment 2.
Figure 26:
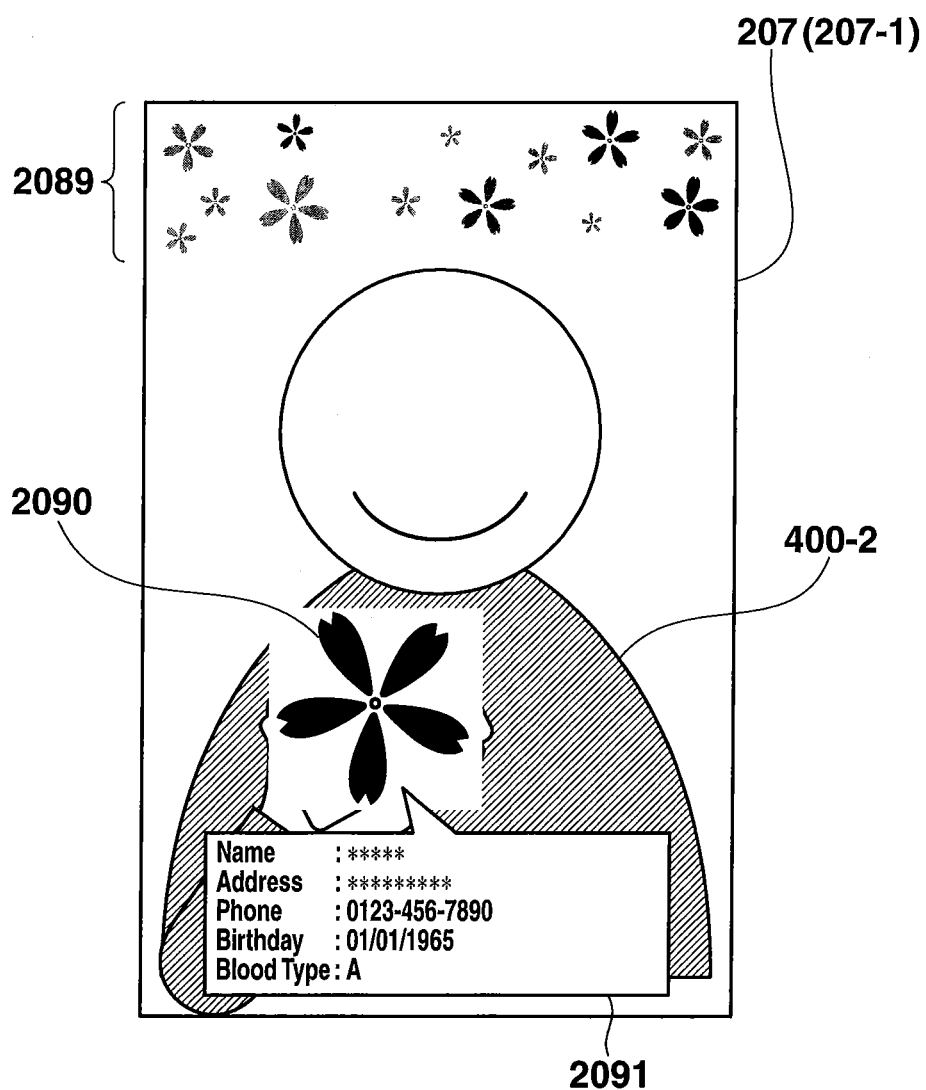
FIG. 26 is an illustration showing an exemplary display of the portable terminal according to Embodiment 2.

FIGS. 25 and 26 show a specific usage example.

For example, FIG. 25 shows a state in which the portable terminal 200-2 executes the above-described procedure in FIG. 20 and, as a result, creates a profile card of the user 400-2 as a content, and transmits a tag ID corresponding to the content by means of time series color change of the marker 2086-2 displayed on the display part 207-2.

FIG. 26 shows an exemplary display on the display part 207-1 of the portable terminal 200-1 capturing the state in FIG. 25.

In the figure, the upper body of the user 400-2 is displayed as a live view and the format of the display layout 2079 in FIG. 22 is further added. In other words, an image 2089 is superimposed and displayed at the top part of the live view, and an image 2090 is superimposed and displayed on an image of the upper body of the user 400-2 on the display part 207-2 of the portable terminal 200-2 (more specifically, the area where the marker 2086-2 is displayed) as the content registered in the server 300 in association with the received tag ID. Furthermore, data of the profile card registered by the user 400-2 as a content registered in the server 300 in association with the received tag ID are displayed in a balloon 2091.

The present invention is not restricted to the above description of embodiments and the drawings. Modifications can be made to the above embodiments and drawings as appropriate. For example, the functions of the illumination device 100, portable terminal 200, and server 300 can be realized by executing programs on a computer. Furthermore, the programs for realizing the functions of the illumination device 100, portable terminal 200, and server 300 can be stored in storage media such as CD-ROMs or downloaded to a computer via a network.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An information provision system including a plurality of transmission devices present at locations different from each other, a terminal device, and a server providing content to the terminal device, wherein:
    each of the transmission devices comprises:
        a first transmitter modulating identification information for identifying the content and transmitting a modulated element by means of light as a transmission medium,
    the terminal device comprises:
        a light receiver receiving the element transmitted from the first transmitter by means of light as a transmission medium;
        an identification information acquirer demodulating the light received by the light receiver and acquiring the identification information;
        a location information acquirer acquiring location information of the terminal device; and
        a second transmitter transmitting the identification information acquired by the identification information acquirer and the location information of the terminal device acquired by the location information acquirer to the server, and
    the server comprises:
        a storage associating and storing location information of the transmission device, identification information, and content;
        a setter setting identification information in association with a content supposed to be provided by acquiring the location information of the transmission device of which the content is already stored in the storage and setting the identification information in association with a transmission device that is away from the location indicated by the location information by a given or longer distance;
        a storing controller controlling the identification information set by the setter, location information of the transmission device transmitting the identification information, and content to be associated and stored in the storage;
        a first receiver receiving the identification information and location information transmitted from the second transmitter of the terminal device;
        a determiner determining the content to be transmitted based on the location information of the terminal device received by the first receiver and the element stored in the storage; and
        a third transmitter transmitting the content determined by the determiner to the terminal device.

2. The information provision system according to claim 1, wherein the storage of the server further stores reachable range information indicating a reachable range of light emitted by the transmission device in association with the identification information and content.

3. The information provision system according to claim 2, wherein the setter sets identification information in association with a content supposed to be provided by further acquiring the reachable range information in addition to the location information of the transmission device of which the content is already stored in the storage and setting the identification information in association with a transmission device present outside the range indicated by the reachable range information.

4. The information provision system according to claim 2, wherein the setter sets identification information in association with a content supposed to be provided by further acquiring the reachable range information in addition to the location information of the transmission device of which the content is already stored in the storage and setting the identification information in association with a transmission device of which the reachable range information indicates a reachable range that does not overlap with the range indicated by the acquired reachable range information.

5. The information provision system according to claim 1, wherein:
    the light receiver of the terminal device includes an image capturer, and
    the terminal device further comprises:
        a display; and
        a display controller controlling the display to display the content transmitted from the third transmitter of the server and a captured image in an associated manner.

6. The information provision system according to claim 1, wherein:
    the terminal device further comprises the functions of the transmission device,
    the server further comprises a second receiver receiving the location information of the terminal device and a content that are transmitted from the terminal device, and
    when the second receiver receives the location information of the terminal device and the content, the setter sets identification information in association with the received content on the assumption that the received content is the content supposed to be provided.

7. The information provision system according to claim 6, wherein:
    the terminal device further comprises a display, and
    the first transmitter transmits the modulated element substantially by means of light as a transmission medium as the display is controlled to change a display color in a time series manner based on the modulated element.

8. A server in an information provision system including a plurality of transmission devices present at locations different from each other, a terminal device, and the server, the server providing content to the terminal device, and the server comprising:
    a storage associating and storing location information of the transmission device, identification information, and content;
    a setter setting identification information in association with a content supposed to be provided by acquiring the location information of the transmission device of which the content is already stored in the storage and setting the identification information in association with a transmission device that is away from the location presented by the location information by a given or longer distance;
    a storing controller controlling the identification information set by the setter, location information of the transmission device transmitting the identification information, and content to be associated and stored in the storage;
    a receiver receiving the identification information and location information transmitted from the terminal device;

a determiner determining the content to be transmitted based on the location information of the terminal device received by the receiver and the element stored in the storage; and a transmitter transmitting the content determined by the determiner to the terminal device.

9. A terminal device comprising:

a creator creating a content;

a transmitter transmitting the content created by the creator to an external server;

a receiver receiving identification information associated with the transmitted information by the external server that has received the information;

a display;

a modulator modulating the identification information received by the receiver to information to be displayed on the display and changing in a time series manner; and a first display controller controlling the display based on the information modulated by the modulator.

10. The terminal device according to claim 9, further comprising a location information acquirer acquiring current location information of the terminal device, wherein the transmitter transmits the created content and the location information acquired by the location information acquirer to the server.

11. The terminal device according to claim 9, wherein:

the display displays an indicator, and the information changing in the time series manner is information changing a display mode of the indicator.

12. The terminal device according to claim 9, wherein the information changing in the time series manner is information changing a display color of the display.

13. The terminal device according to claim 9, further comprising:

a light receiver;

a light reception controller controlling the light receiver to receive a mode of the display of another terminal device changing in a time series manner under the control of the first display controller as light;

a demodulator demodulating the mode of change received by the light reception controller to the identification information; and an acquirer transmitting the demodulated identification information to the server and acquiring the content in response.

14. The terminal device according to claim 13, wherein:

the light receiver includes an image capturer, and the terminal device further comprises a second display controller controlling the content acquired by the acquirer to be displayed on the display together with a captured image.

15. The terminal device according to claim 14, wherein the second display controller controls the content to be superimposed and displayed at a position where the display of the other terminal device is displayed within an image-capturing range captured by the image capturer.

16. An information provision method for a server in an information provision system including a plurality of transmission devices present at locations different from each other, a terminal device, and the server which provides content to the terminal device, the method comprising:

a setting step of setting identification information in association with a content supposed to be provided by acquiring the location information of the transmission device of which the content is already stored in a storage, associating and storing the location information of the transmission device, identification information, and content in advance, and setting the identification information in association with a transmission device that is away from the location indicated by the location information by a given or longer distance;

a storing control step of controlling the identification information set in the setting step, location information of the transmission device transmitting the identification information, and content to be associated and stored in the storage;

a reception step of receiving the identification information and location information transmitted from the terminal device;

a determination step of determining the content to be transmitted based on the location information of the terminal device received in the reception step and the element stored in the storage; and a transmission step of transmitting the content determined in the determination step to the terminal device.

17. A display control method, including:

a creation step of creating a content;

a transmission step of transmitting the content created in the creation step to an external server;

a reception step of receiving identification information associated with the transmitted information by the external server that has received the information;

a modulation step of modulating the identification information received in the reception step to information to be displayed on a display and changing in a time series manner; and a display control step of controlling the display based on the information modulated in the modulation step.

18. A non-transitory computer readable recording medium having a program stored thereon for controlling a server in an information provision system including a plurality of transmission devices present at locations different from each other, a terminal device, and the server which provides content to the terminal device, the program being executable to control the server to function as:

a setter setting identification information in association with a content supposed to be provided by acquiring the location information of the transmission device of which the content is already stored in a storage, associating and storing the location information of the transmission device, identification information, and content in advance, and setting the identification information in association with a transmission device that is away from the location indicated by the location information by a given or longer distance;

a storing controller controlling the identification information set by the setter, location information of the transmission device transmitting the identification information, and content to be associated and stored in the storage;

a receiver receiving the identification information and location information transmitted from the terminal device;

a determiner determining the content to be transmitted based on the location information of the terminal device received by the receiver and the element stored in the storage; and a transmitter transmitting the content determined by the determiner to the terminal device.

19. A non-transitory computer readable recording medium having a program stored thereon, the program being executable to control a computer in a terminal device comprising a display to function as:

a creator creating a content;

a transmitter transmitting the content created by the creator to an external server;
a receiver receiving identification information associated with the transmitted information by the external server that has received the information;
a modulator modulating the identification information received by the receiver to information to be displayed on the display and changing in a time series manner; and
a first display controller controlling the display based on the information modulated by the modulator.

* * * * *